(12) United States Patent
Togashi

(10) Patent No.: US 7,432,784 B2
(45) Date of Patent: Oct. 7, 2008

(54) NOISE FILTER AND MOUNTED STRUCTURE OF NOISE FILTER

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 120 days.

(21) Appl. No.: 11/655,069

(22) Filed: Jan. 19, 2007

(65) Prior Publication Data
US 2007/0188267 A1 Aug. 16, 2007

(30) Foreign Application Priority Data
Feb. 16, 2006 (JP) .............................. 2006-039801

(51) Int. Cl.
H03H 7/00 (2006.01)
(52) U.S. Cl. .................. 333/185; 333/172; 333/184; 333/204
(58) Field of Classification Search ................ 333/172, 333/175, 177, 184, 185, 202, 204
See application file for complete search history.

(56) References Cited
U.S. PATENT DOCUMENTS
5,357,227 A * 10/1994 Tonegawa et al. ........... 333/185
7,161,446 B2 * 1/2007 Uchida et al. ............... 333/185

FOREIGN PATENT DOCUMENTS
JP   A 55-43869   3/1980

* cited by examiner

Primary Examiner—Anh Q Tran
(74) Attorney, Agent, or Firm—Oliff & Berridge, PLC

(57) ABSTRACT

A noise filter has an element body, first to fourth terminal electrodes, and a connection conductor. The first to fourth terminal electrodes are disposed on the exterior of the element body. The connection conductor is also disposed on the exterior of the element body. A capacitor is formed in the element body and is electrically connected between the first and second terminal electrodes and the third and fourth terminal electrodes. The first and second terminal electrodes are electrically connected through the connection conductor. The connection conductor is covered by a resin containing ferrite. Since the connection conductor is covered by the resin containing ferrite, the connection conductor and the ferrite-containing resin function as a ferrite bead inductor.

12 Claims, 24 Drawing Sheets

NOISE FILTER AND MOUNTED STRUCTURE OF NOISE FILTER

BACKGROUND OF THE INVENTION

1. Field of the Invention

The present invention relates to a noise filter and a mounted structure of a noise filter.

2. Related Background Art

A three-terminal capacitor, a feedthrough capacitor, or the like is sometimes used as a noise filter for preventing leakage or penetration of noise through interconnections for power, signals, and so on. A known feedthrough capacitor is a multilayer feedthrough capacitor in which a signal-side internal electrode and a ground-side internal electrode are laminated through an insulator layer (e.g., reference is made to Japanese Patent Application Laid-Open No. 55-43869).

SUMMARY OF THE INVENTION

However, the noise removal effect is not satisfactory yet with the three-terminal capacitor and the feedthrough capacitor (e.g., the multilayer feedthrough capacitor described in the foregoing Laid-Open No. 55-43869).

An object of the present invention is to provide a noise filter capable of further improving the noise removal effect, and a mounted structure of a noise filter.

A noise filter according to the present invention is a noise filter comprising: an element body; first to fourth terminal electrodes disposed on an exterior of the element body; and a connection conductor disposed on the exterior; wherein a capacitor is formed in the element body and is electrically connected between the first and second terminal electrodes and the third and fourth terminal electrodes; wherein the first and second terminal electrodes are electrically connected through the connection conductor; and wherein the connection conductor is covered by a resin containing ferrite.

Since in the noise filter of the present invention the connection conductor for electrically connecting the first terminal electrode and the second terminal electrode is covered by the resin containing ferrite, the connection conductor and the ferrite-containing resin function as a ferrite bead inductor. This further improves the noise removal effect.

Preferably, the element body has a plurality of insulator layers laminated, and a signal-side internal electrode and a ground-side internal electrode arranged to face each other with the insulator layer in between; the signal-side internal electrode includes a pair of signal-side lead portions led to the exterior, and the pair of signal-side lead portions are electrically connected to the first and second terminal electrodes, respectively; the ground-side internal electrode includes a pair of ground-side lead portions led to the exterior, and the pair of ground-side lead portions are electrically connected to the third and fourth terminal electrodes, respectively; and the signal-side internal electrode and the ground-side internal electrode form the capacitor.

Preferably, the noise filter further comprises fifth and sixth terminal electrodes disposed on the exterior; and a new connection conductor disposed on the exterior; the element body further has a new signal-side internal electrode arranged to face the ground-side internal electrode with the insulator layer in between; the new signal-side internal electrode includes a pair of signal-side lead portions led to the exterior, and the pair of signal-side lead portions are electrically connected to the fifth and sixth terminal electrodes, respectively; the new signal-side internal electrode and the ground-side internal electrode form a capacitor; the fifth and sixth terminal electrodes are electrically connected through the new connection conductor; and the new connection conductor is covered by a resin containing ferrite. In this case, since the connection conductor for electrically connecting the fifth terminal electrode and the sixth terminal electrode is covered by the resin containing ferrite, the connection conductor and the ferrite-containing resin function as a ferrite bead inductor. This further improves the noise removal effect even in the configuration wherein the noise filter has the fifth and sixth terminal electrodes and the signal-side internal electrode electrically connected to the fifth and sixth terminal electrodes.

Preferably, the signal-side internal electrode and the new signal-side internal electrode are arranged flush with each other. Since this configuration decreases the number of internal electrode layers, the noise filter can be constructed in a lower profile.

Preferably, the element body has a plurality of insulator layers laminated, and a ground-side internal electrode and a pair of signal-side internal electrodes arranged to face each other with the insulator layer in between; one signal-side internal electrode out of the pair of signal-side internal electrodes includes a signal-side lead portion led to the exterior, and the signal-side lead portion is electrically connected to the first terminal electrode; the other signal-side internal electrode out of the pair of signal-side internal electrodes includes a signal-side lead portion led to the exterior, and the signal-side lead portion is electrically connected to the second terminal electrode; the ground-side internal electrode includes a pair of ground-side lead portions led to the exterior, and the pair of ground-side lead portions are electrically connected to the third and fourth terminal electrodes, respectively; and the pair of signal-side internal electrodes and the ground-side internal electrode form the capacitor.

Preferably, the pair of signal-side internal electrodes are arranged flush with each other. Since this configuration decreases the number of internal electrode layers, the noise filter can be constructed in a lower profile.

Preferably, the noise filter further comprises fifth and sixth terminal electrodes disposed on the exterior; and a new connection conductor disposed on the exterior; the element body further has a pair of new signal-side internal electrodes arranged to face the ground-side internal electrode with the insulator layer in between; one signal-side internal electrode out of the pair of new signal-side internal electrodes includes a signal-side lead portion led to the exterior, and the signal-side lead portion is electrically connected to the fifth terminal electrode; the other signal-side internal electrode out of the pair of new signal-side internal electrodes includes a signal-side lead portion led to the exterior, and the signal-side lead portion is electrically connected to the sixth terminal electrode; the pair of new signal-side internal electrodes and the ground-side internal electrode form a capacitor; the fifth and sixth terminal electrodes are electrically connected through the new connection conductor; and the new connection conductor is covered by a resin containing ferrite. In this case, since the connection conductor for electrically connecting the fifth terminal electrode and the sixth terminal electrode is covered by the resin containing ferrite, the connection conductor and the ferrite-containing resin function as a ferrite bead inductor. This can further improve the noise removal effect even in the configuration wherein the noise filter has the fifth and sixth terminal electrodes and the signal-side internal electrodes electrically connected to the fifth and sixth terminal electrodes.

Preferably, the pair of new signal-side internal electrodes are arranged flush with each other. Since this configuration decreases the number of internal electrode layers, the noise filter can be constructed in a lower profile.

Preferably, the pair of signal-side internal electrodes and the pair of new signal-side internal electrodes are arranged flush with each other. Since this configuration decreases the number of internal electrode layers, the noise filter can be constructed in a still lower profile.

Preferably, the connection conductor is narrower in width than the first and second terminal electrodes.

Preferably, the connection conductor is of a meander shape.

A mounted structure of a noise filter according to the present invention is a noise filter mounted structure comprising: the noise filter as described above; and a circuit board in which a ground electrode and at least two signal electrodes are disposed on a mounting surface; wherein the first and second terminal electrodes of the noise filter are connected to different signal electrodes, respectively, out of at least two signal electrodes, and wherein the third and fourth terminal electrodes of the noise filter are connected each to the ground electrode.

Since the mounted structure of the noise filter according to the present invention has the mounted noise filter wherein the connection conductor for electrically connecting the first terminal electrode and the second terminal electrode is covered by the resin containing ferrite, the connection conductor and the ferrite-containing resin function as a ferrite bead inductor. This further improves the noise removal effect.

The present invention successfully provides the noise filter capable of further improving the noise removal effect, and the mounted structure of the noise filter.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, identical elements or elements with identical functionality will be denoted by the same reference symbols, without redundant description.

Figure 1:
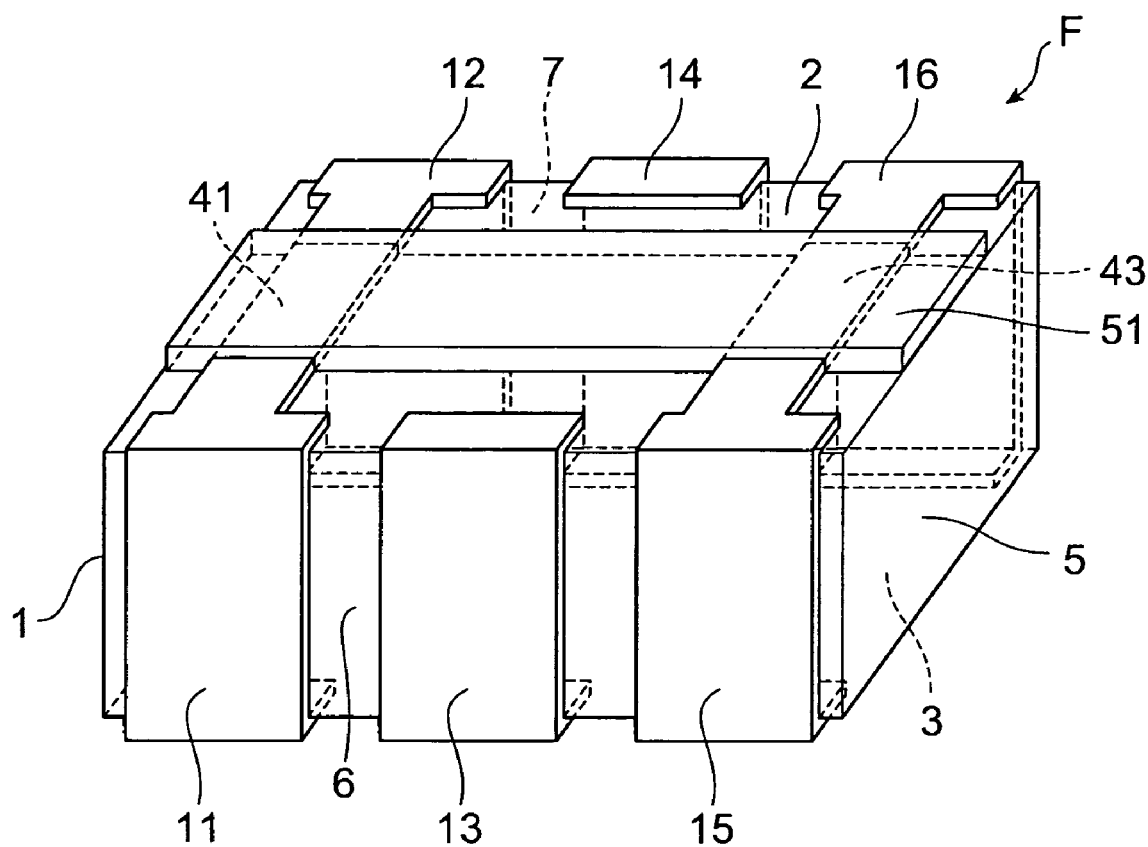
FIG. 1 is a perspective view of a noise filter according to an embodiment of the present invention.
Figure 2:
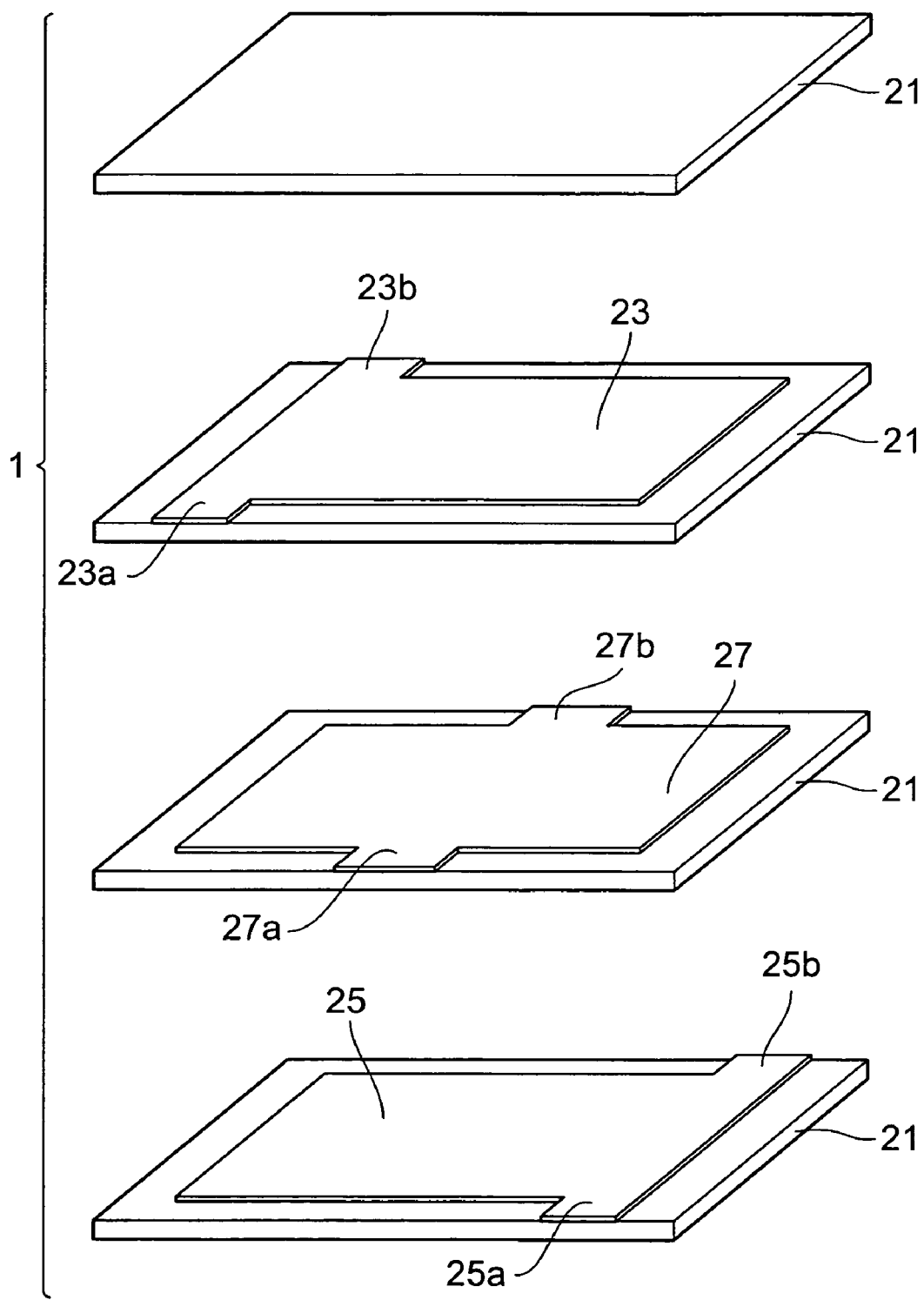
FIG. 2 is an exploded perspective view of an element body included in the noise filter according to the embodiment.
Figure 3:
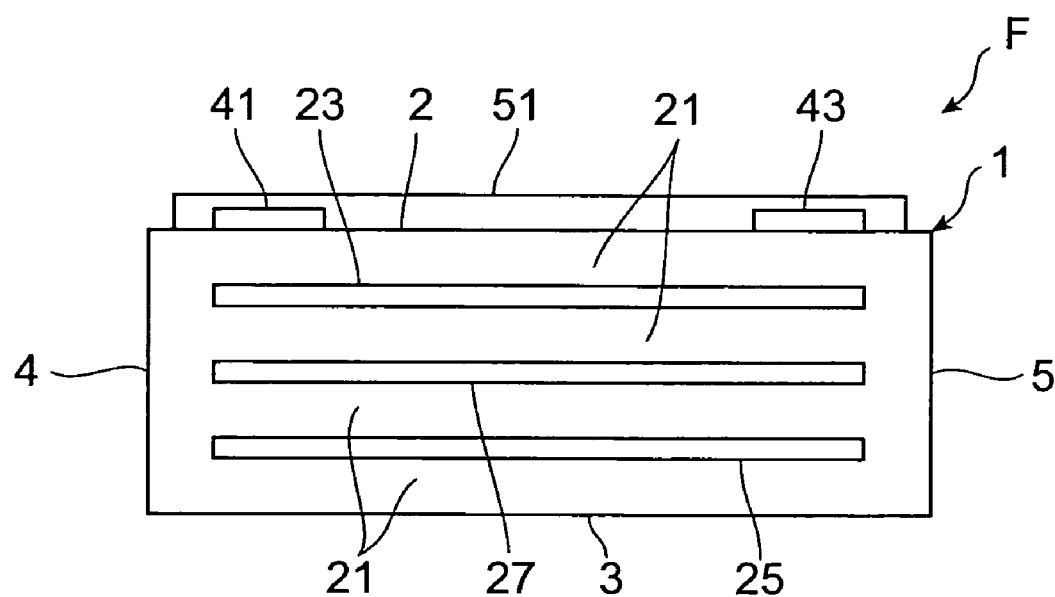
FIG. 3 is a schematic view for explaining a sectional configuration of the noise filter according to the embodiment.

A configuration of a noise filter F according to an embodiment of the present invention will be described with reference to FIGS. 1 to 3. FIG. 1 is a perspective view of the noise filter according to the present embodiment. FIG. 2 is an exploded perspective view of an element body included in the noise filter according to the present embodiment. FIG. 3 is a schematic view for explaining a sectional configuration of the noise filter according to the present embodiment.

The noise filter F, as shown in FIG. 1, has an element body 1 of an approximately rectangular parallelepiped shape, and first to sixth terminal electrodes 11-16 disposed on the exterior of the element body 1. The element body 1 includes first and second principal faces 2, 3 facing each other, first and second end faces 4, 5 facing each other, and first and second side faces 6, 7 facing each other. The first and second end faces 4, 5 and the first and second side faces 6, 7 extend so as to connect between the first principal face 2 and the second principal face 3.

The first terminal electrode 11, third terminal electrode 13, and fifth terminal electrode 15 are disposed on the first side face 6 of the element body 1. The first terminal electrode 11 and the fifth terminal electrode 15 are located in edge regions of the first side face 6. The 5 third terminal electrode 13 is located in a central region of the first side face 6. The second terminal electrode 12, fourth terminal electrode 14, and sixth terminal electrode 16 are disposed on the second side face 7 of the element body 1. The second terminal electrode 12 and the sixth terminal electrode 16 are located in edge regions of the second side face 7. The fourth terminal electrode 14 is located in a central region of the second side face 7. The first and second terminal electrodes 11, 12 and the fifth and sixth terminal electrodes 15, 16 function as signal-side terminal electrodes. The third and fourth terminal electrodes 13, 14 function as ground-side terminal electrodes.

The first to sixth terminal electrodes 11-16 are formed, for example, by applying an electroconductive paste containing electroconductive metal powder and glass frit, onto the exterior of the element body 1 and baking it. A plated layer can be formed on the baked electrodes according to need.

The element body 1, as shown in FIG. 2, has a plurality of insulator layers 21 laminated, signal-side internal electrodes 23, 25, and a ground-side internal electrode 27. Each insulator layer 21 extends in parallel with the first and second principal faces 2, 3. In the element body 1, a direction in which the first principal face 2 and the second principal face 3 face each other is a laminate direction of the plurality of insulator layers 21. The signal-side internal electrode 23 and the ground-side internal electrode 27 are arranged to face each other with the insulator layer 21 in between. The signal-side internal electrode 25 and the ground-side internal electrode 27 are arranged to face each other with the insulator layer 21 in between.

Each insulator layer 21 is comprised, for example, of a sintered body of a ceramic green sheet containing a dielectric ceramic. In a practical noise filter F, the insulator layers 21 are integrally formed so that no boundary can be visually recognized between the insulator layers 21. Each of the internal electrodes 23-27 is comprised of a sintered body of an electroconductive paste.

The signal-side internal electrode 23 includes a pair of signal-side lead portions 23a, 23b. The signal-side lead portion 23a is led to the first side face 6 and is electrically and physically connected to the first terminal electrode 11. The signal-side lead portion 23b is led to the second side face 7 and is electrically and physically connected to the second terminal electrode 12. The signal-side internal electrode 23 penetrates the element body 1 from the first side face 6 to the second side face 7 and is electrically connected to the first terminal electrode 11 and to the second terminal electrode 12.

The signal-side internal electrode 25 includes a pair of signal-side lead portions 25a, 25b. The signal-side lead portion 25a is led to the first side face 6 and is electrically and physically connected to the fifth terminal electrode 15. The signal-side lead portion 25b is led to the second side face 7 and is electrically and physically connected to the sixth terminal electrode 16. The signal-side internal electrode 25 penetrates the element body 1 from the first side face 6 to the second side face 7 and is electrically connected to the fifth terminal electrode 15 and to the sixth terminal electrode 16.

The ground-side internal electrode 27 includes a pair of ground-side lead portions 27a, 27b. The ground-side lead portion 27a is led to the first side face 6 and is electrically and physically connected to the third terminal electrode 13. The ground-side lead portion 27b is led to the second side face 7 and is electrically and physically connected to the fourth terminal electrode 14. The ground-side internal electrode 27 penetrates the element body 1 from the first side face 6 to the second side face 7 and is electrically connected to the third terminal electrode 13 and to the fourth terminal electrode 14.

Two connection conductors 41, 43 are disposed on the first principal face 2 of the element body 1, as also shown in FIG. 3. The connection conductor 41 electrically connects the first terminal electrode 11 and the second terminal electrode 12. The connection conductor 41 extends in a direction in which the first side face 6 and the second side face 7 face each other, on the first principal face 2, and is narrower in width than the first and second terminal electrodes 11, 12. The connection conductor 43 electrically connects the fifth terminal electrode 15 and the sixth terminal electrode 16. The connection conductor 43 extends in the direction in which the first side face 6 and the second side face 7 face each other, on the first principal face 2, and is narrower in width than the fifth and sixth terminal electrodes 15, 16. The term "width" herein means a length in a direction in which the first end face 4 and the second end face 5 face each other.

Just as the first to sixth terminal electrodes 11-16 are, the connection conductors 41, 43 are formed, for example, by applying an electroconductive paste containing electroconductive metal powder and glass frit, onto the exterior of the element body 1 and baking it. A plated layer can be formed on the baked electrodes according to need. The connection conductors 41, 43 may be formed integrally with the first to sixth terminal electrodes 11-16.

The two connection conductors 41, 43 are covered by resin 51 containing ferrite (e.g., powdered ferrite or the like). The resin 51 is formed by being cured after applied onto the first principal face 2 so as to cover the connection conductors 41, 43. The resin 51 preferably has an electrically insulating property and can be, for example, an epoxy resin, a phenol resin, an epoxy phenol resin, or the like.

Figure 4:
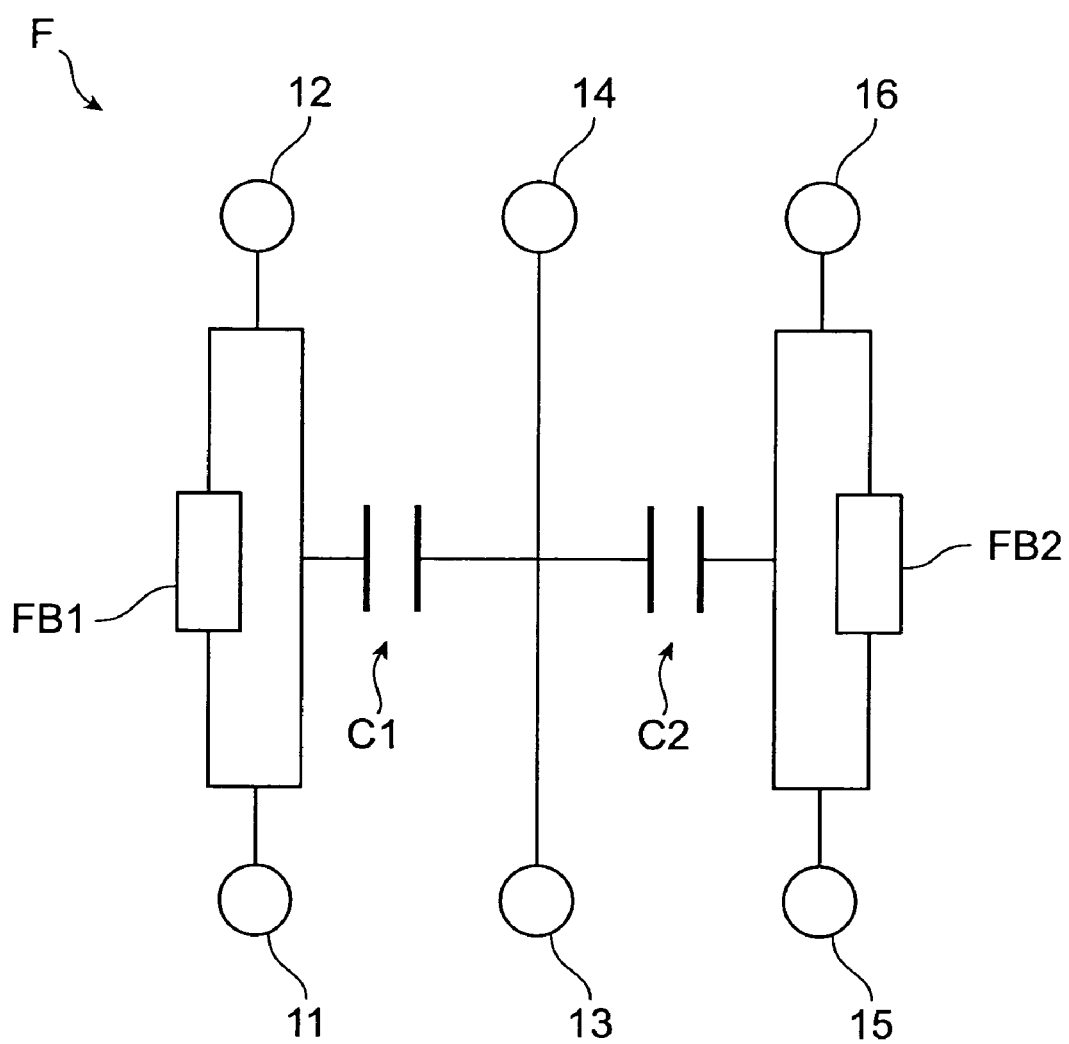
FIG. 4 is an equivalent circuit diagram of the noise filter according to the embodiment.

The noise filter F constructed as described above, as shown in FIG. 4, has a pair of capacitors C1, C2, and ferrite bead inductors FB1, FB2. FIG. 4 is an equivalent circuit diagram of the noise filter according to the present embodiment. The capacitor C1 is comprised of the signal-side internal electrode 23 and the ground-side internal electrode 27. The capacitor C2 is comprised of the signal-side internal electrode 25 and the ground-side internal electrode 27. The ferrite bead inductor FB1 is comprised of the connection conductor 41 and the ferrite-containing resin 51. The ferrite bead inductor FB2 is comprised of the connection conductor 43 and the ferrite-containing resin 51.

In the present embodiment, as described above, the connection conductor 41 for electrically connecting the first terminal electrode 11 and the second terminal electrode 12, and the resin 51 containing ferrite, function as the ferrite bead inductor FB1. In the present embodiment, the connection conductor 43 for electrically connecting the fifth terminal electrode 15 and the sixth terminal electrode 16, and the resin 51 containing ferrite, function as the ferrite bead inductor FB2. This further improves the noise removal effect of the noise filter F.

Next, configurations of modification examples of the noise filter F according to the present embodiment will be described below with reference to FIGS. 5 to 12.

Figure 5:
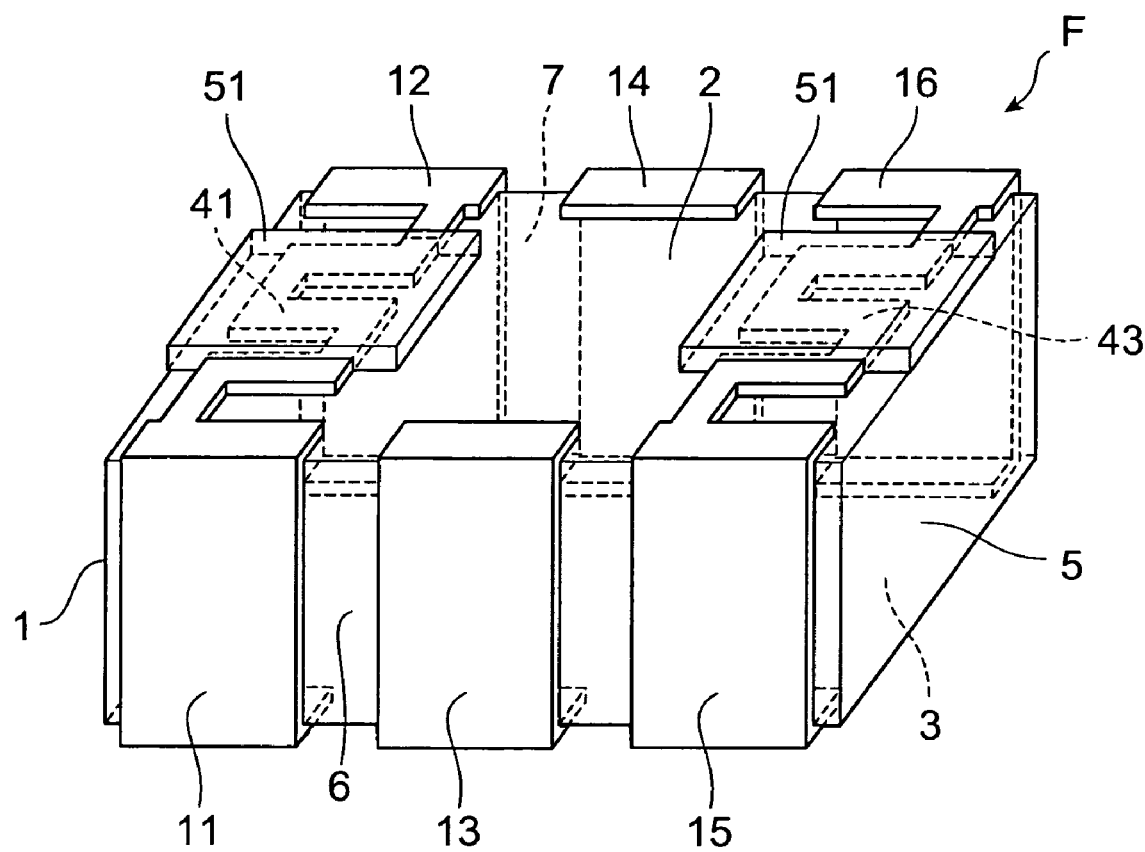
FIG. 5 is a perspective view showing a modification example of the noise filter according to the embodiment.

FIG. 5 is a perspective view showing a modification example of the noise filter according to the present embodiment. The modification example of the noise filter F shown in FIG. 5 is different in the shape of the connection conductors 41, 43 from the above-described embodiment. In the modification example of the noise filter F shown in FIG. 5, each connection conductor 41, 43 is of a meander shape. When each connection conductor 41, 43 is of the meander shape, a conductor length of the connection conductor 41, 43 can be adjusted to a desired value.

Figure 6:
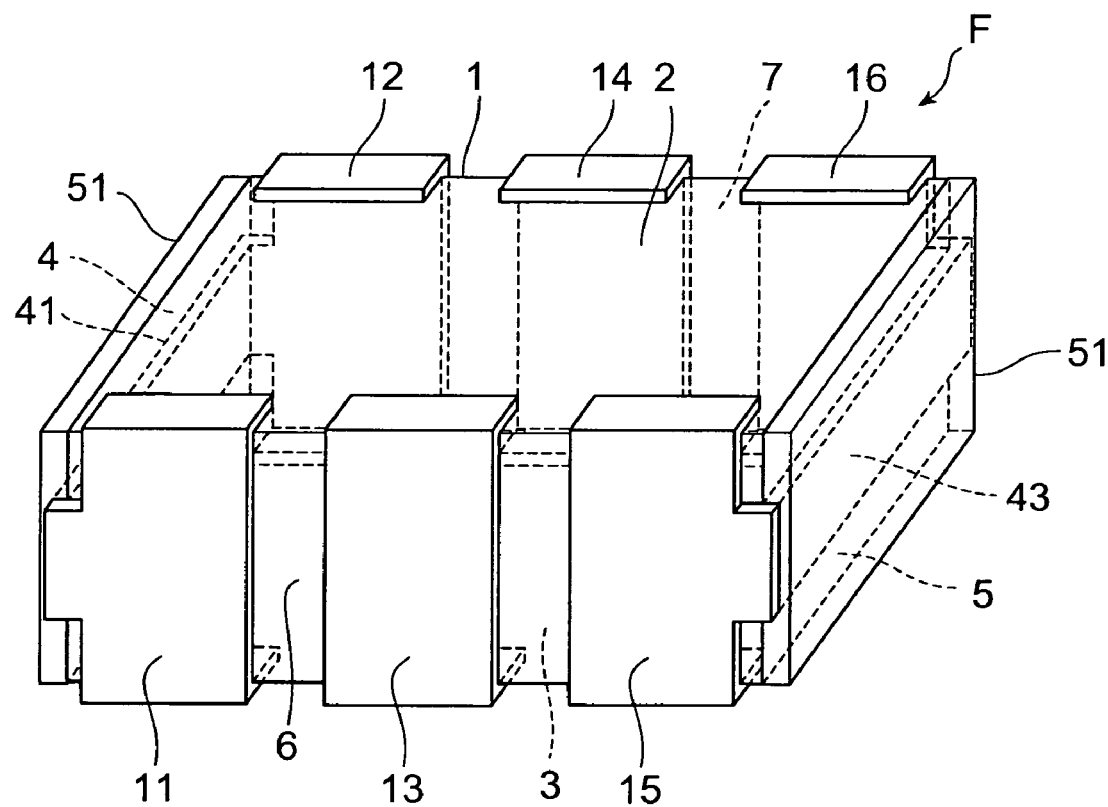
FIG. 6 is a perspective view showing another modification example of the noise filter according to the embodiment.
Figure 7:
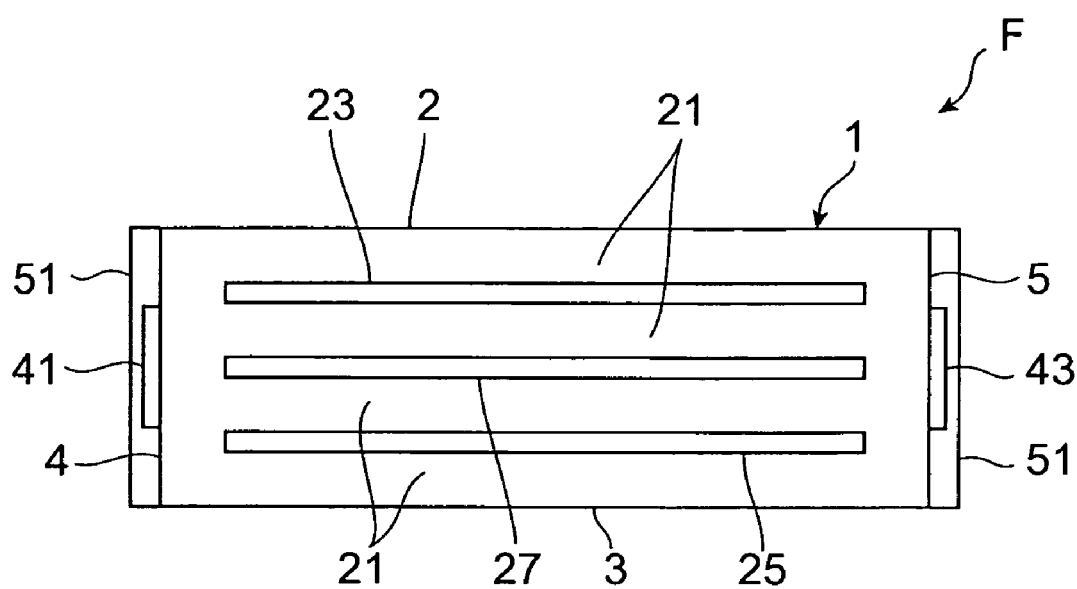
FIG. 7 is a schematic view for explaining a sectional configuration of the modification example of the noise filter shown in FIG. 6.

FIG. 6 is a perspective view showing another modification example of the noise filter according to the present embodiment. FIG. 7 is a schematic view for explaining a sectional configuration of the modification example of the noise filter shown in FIG. 6. The modification example of the noise filter F shown in FIGS. 6 and 7 is different in the locations of the connection conductors 41, 43 from the above-described embodiment. In the modification example of the noise filter F shown in FIGS. 6 and 7, the connection conductor 41 is disposed on the first end face 4 and the connection conductor 43 on the second end face 5.

The connection conductor 41 extends in the direction in which the first side face 6 and the second side face 7 face each other, on the first end face 4, and is narrower in width than the first and second terminal electrodes 11, 12. The connection conductor 43 extends in the direction in which the first side face 6 and the second side face 7 face each other, on the second end face 5 and is narrower in width than the fifth and sixth terminal electrodes 15, 16. The term "width" herein means a length in the direction in which the first principal face 2 and the second principal face 3 face each other. Resins 51 containing ferrite cover the respective connection conductors 41, 43. Each of the resins 51 containing ferrite is formed by being cured after applied to each end face 4, 5 so as to cover the connection conductor 41, 43.

Figure 8:
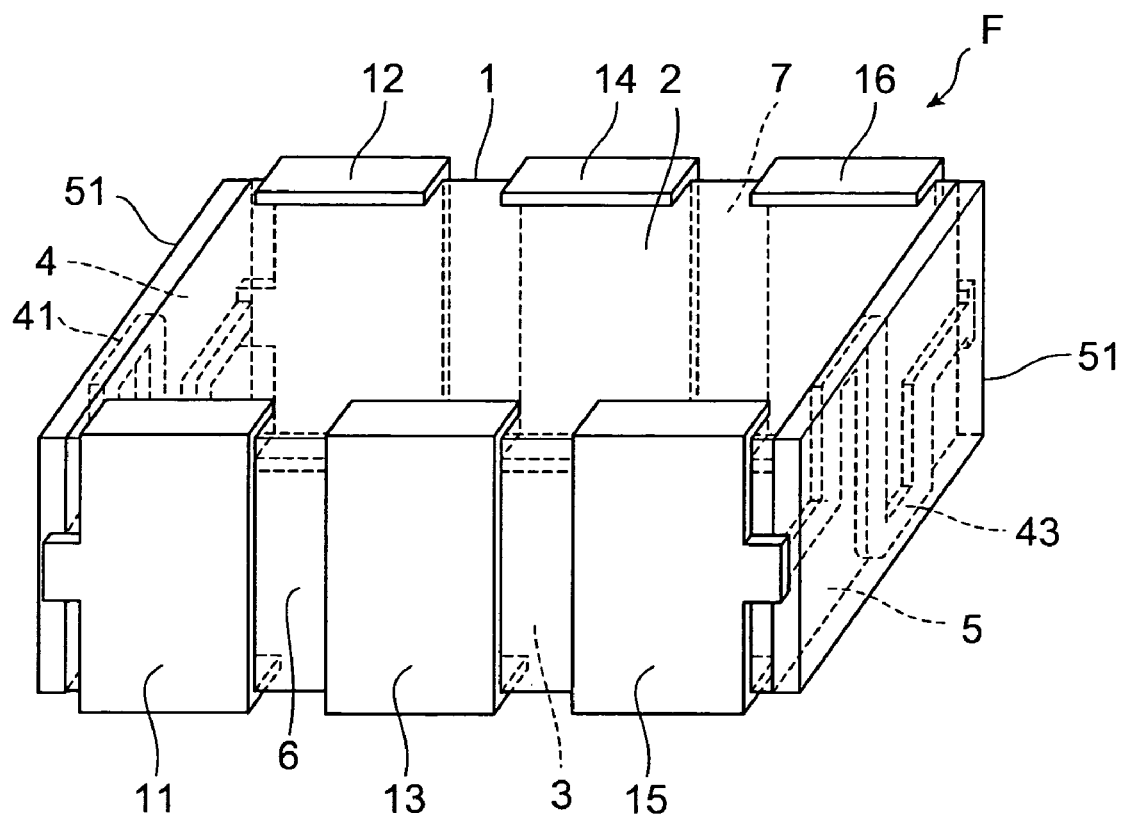
FIG. 8 is a perspective view showing another modification example of the noise filter according to the embodiment.

FIG. 8 is a perspective view showing a modification example of the noise filter according to the present embodiment. The modification example of the noise filter F shown in FIG. 8 is different in the shape of the connection conductors 41, 43 from the modification example of the noise filter F shown in FIGS. 6 and 7. In the modification example of the noise filter F shown in FIG. 8, each connection conductor 41, 43 is of a meander shape. When each connection conductor 41, 43 is of the meander shape, a conductor length of the connection conductor 41, 43 can be adjusted to a desired value.

Figure 9:
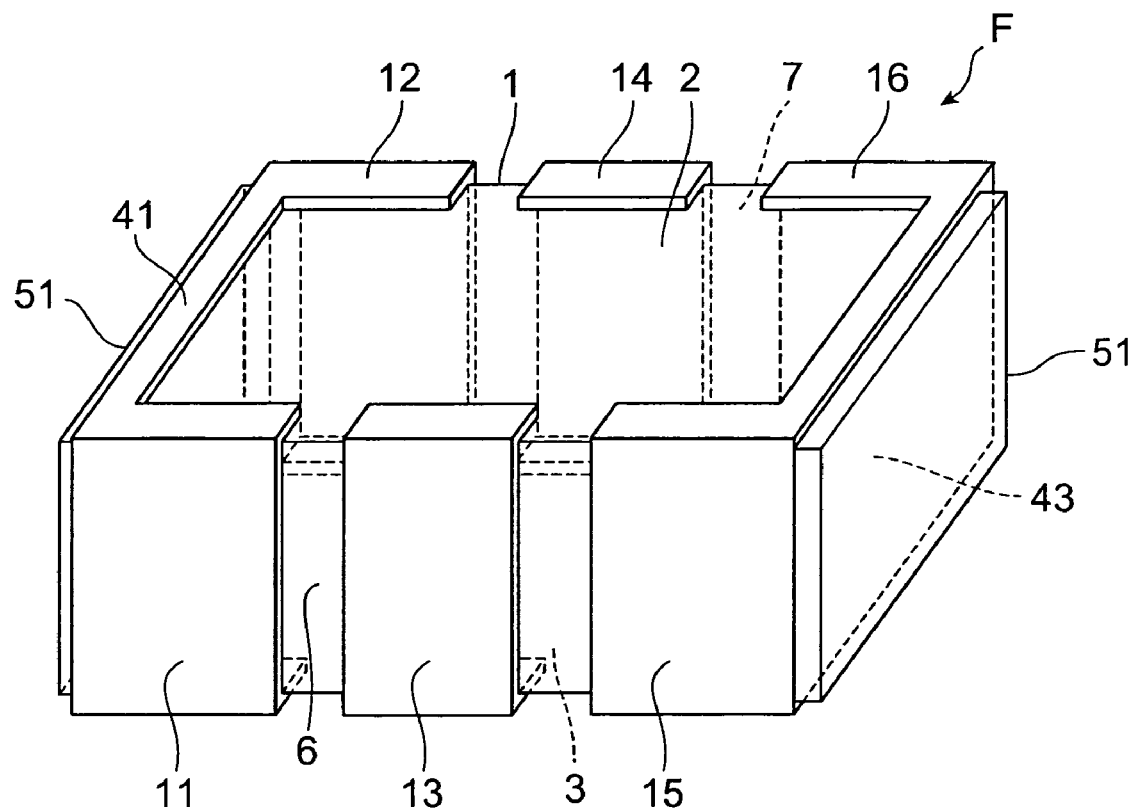
FIG. 9 is a perspective view showing still another modification example of the noise filter according to the embodiment.
Figure 10:
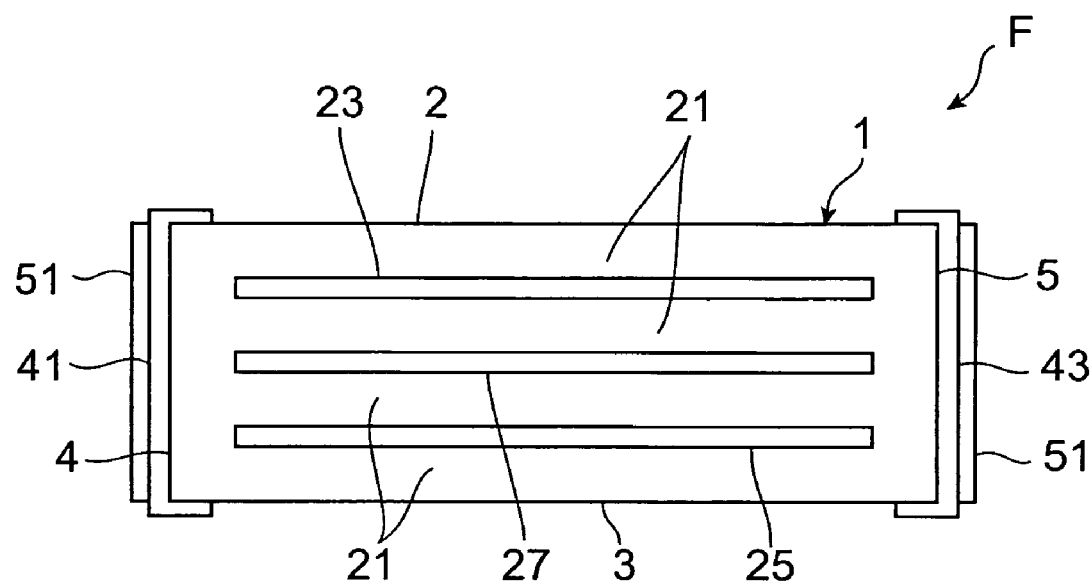
FIG. 10 is a schematic view for explaining a sectional configuration of the modification example of the noise filter shown in FIG. 9.

FIG. 9 is a perspective view showing another modification example of the noise filter according to the present embodiment. FIG. 10 is a schematic view for explaining a sectional configuration of the modification example of the noise filter shown in FIG. 9. The modification example of the noise filter F shown in FIGS. 9 and 10 is different in the shape of the connection conductors 41, 43 from the modification example of the noise filter F shown in FIGS. 6 and 7. The connection conductor 41 has the same width as the first and second terminal electrodes 11, 12. The connection conductor 43 has the same width as the fifth and sixth terminal electrodes 15, 16.

Figure 11:
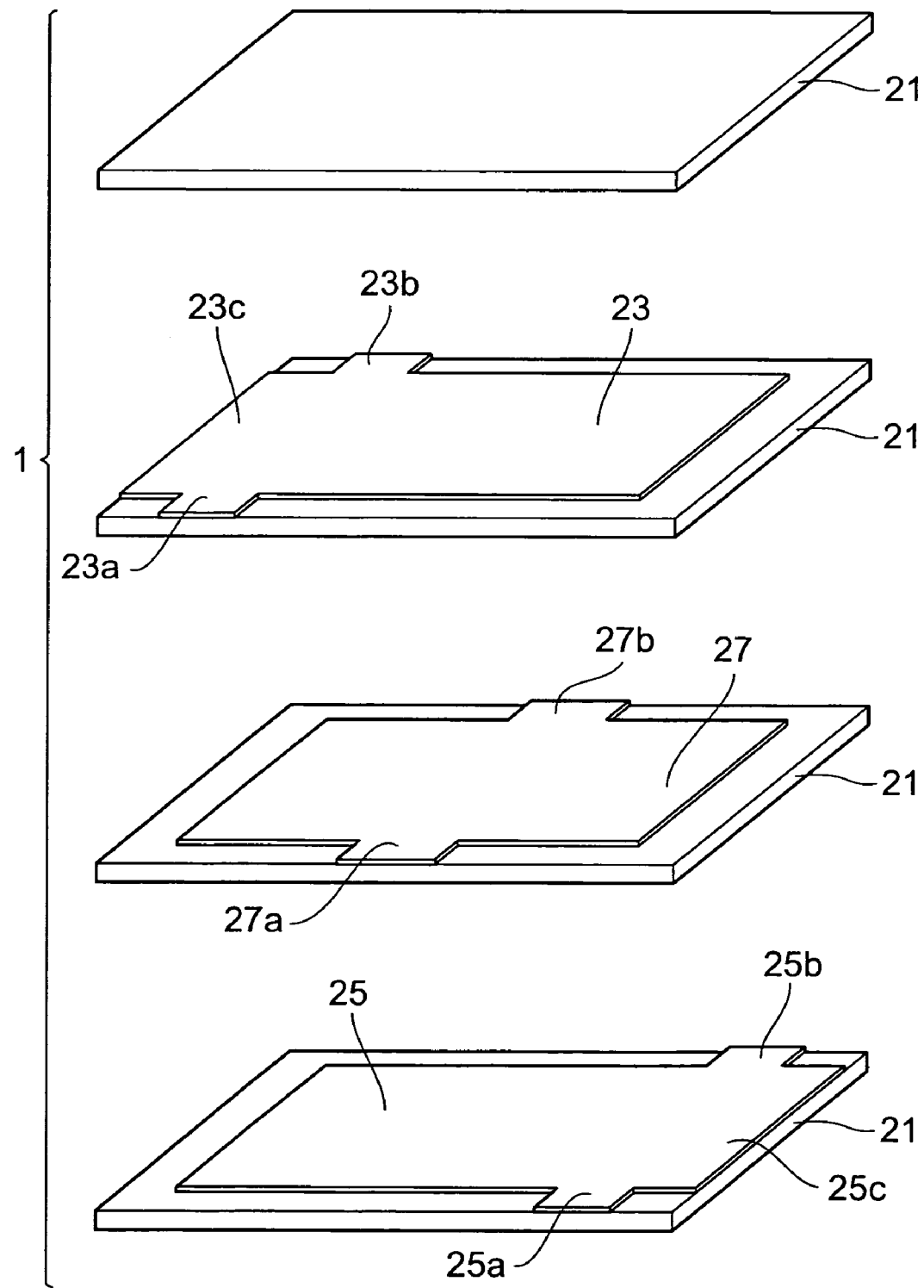
FIG. 11 is an exploded perspective view showing a modification example of the element body included in the noise filter according to the embodiment.
Figure 12:
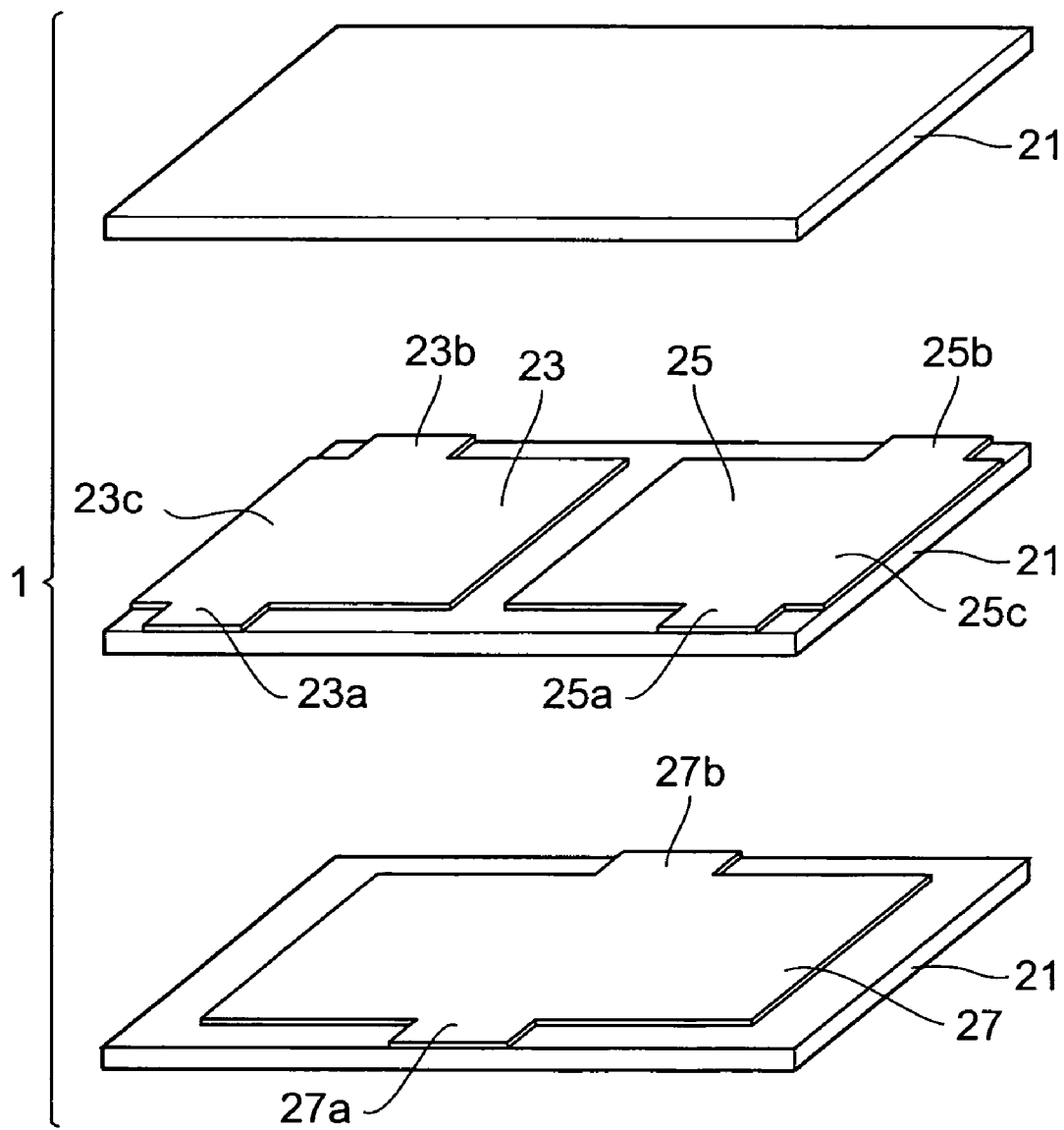
FIG. 12 is an exploded perspective view showing another modification example of the element body included in the noise filter according to the embodiment.
Figure 13:
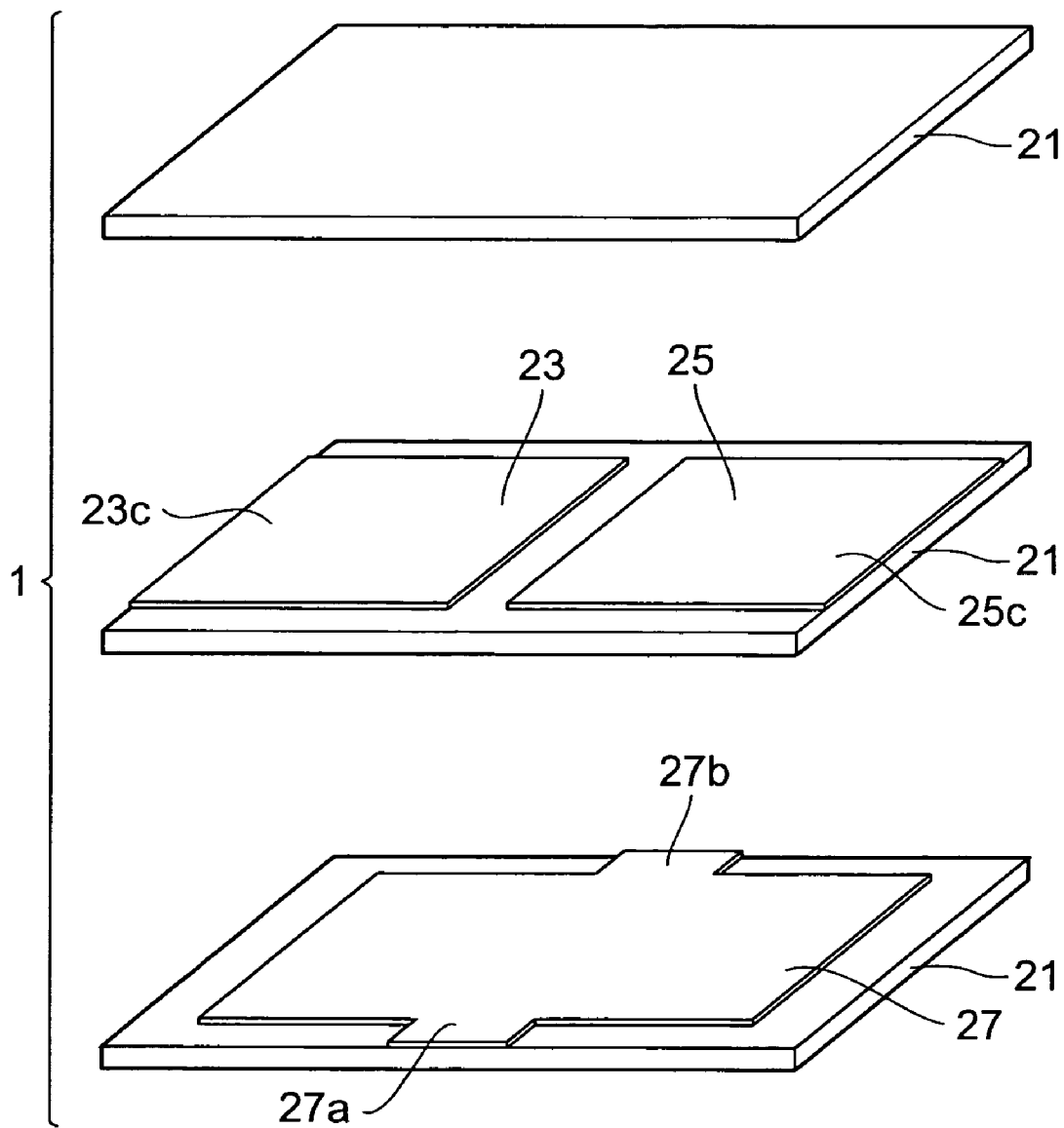
FIG. 13 is an exploded perspective view showing still another modification example of the element body included in the noise filter according to the embodiment.

In the modification example of the noise filter F shown in FIGS. 9 and 10, the element body 1 may be configured as shown in FIGS. 11-13. FIGS. 11-13 are exploded perspective views showing respective modification examples of the element body included in the noise filter according to the present embodiment.

In the modification example shown in FIG. 11, the signal-side internal electrode 23 includes a signal-side lead portion 23c. The signal-side lead portion 23c is led to the first end face 4 and is electrically and physically connected to the connection conductor 41. The signal-side internal electrode 23 is electrically connected to the first terminal electrode 11, to the second terminal electrode 12, and to the connection conductor 41. The signal-side internal electrode 25 includes a signal-side lead portion 25c. The signal-side lead portion 25c is led to the second end face 5 and is electrically and physically connected to the connection conductor 43. The signal-side internal electrode 25 is electrically connected to the fifth terminal electrode 15, to the sixth terminal electrode 16, and to the connection conductor 43.

In the modification example shown in FIG. 12, the signal-side internal electrode 23 and the signal-side internal electrode 25 are arranged flush with each other. This decreases the number of layers of internal electrodes 23, 25, 27 and thus the noise filter F (element body 1) can be constructed in a lower profile.

In the modification example shown in FIG. 13, the signal-side internal electrode 23 does not include the signal-side lead portions 23a, 23b, but includes the signal-side lead portion 23c. In this case, the signal-side internal electrode 23 is electrically connected through the connection conductor 41 to the first terminal electrode 11 and to the second terminal electrode 12. The signal-side internal electrode 25 does not include the signal-side lead portions 25a, 25b, but includes the signal-side lead portion 25c. In this case, the signal-side internal electrode 25 is electrically connected through the connection conductor 43 to the fifth terminal electrode 15 and to the sixth terminal electrode 16.

Figure 14:
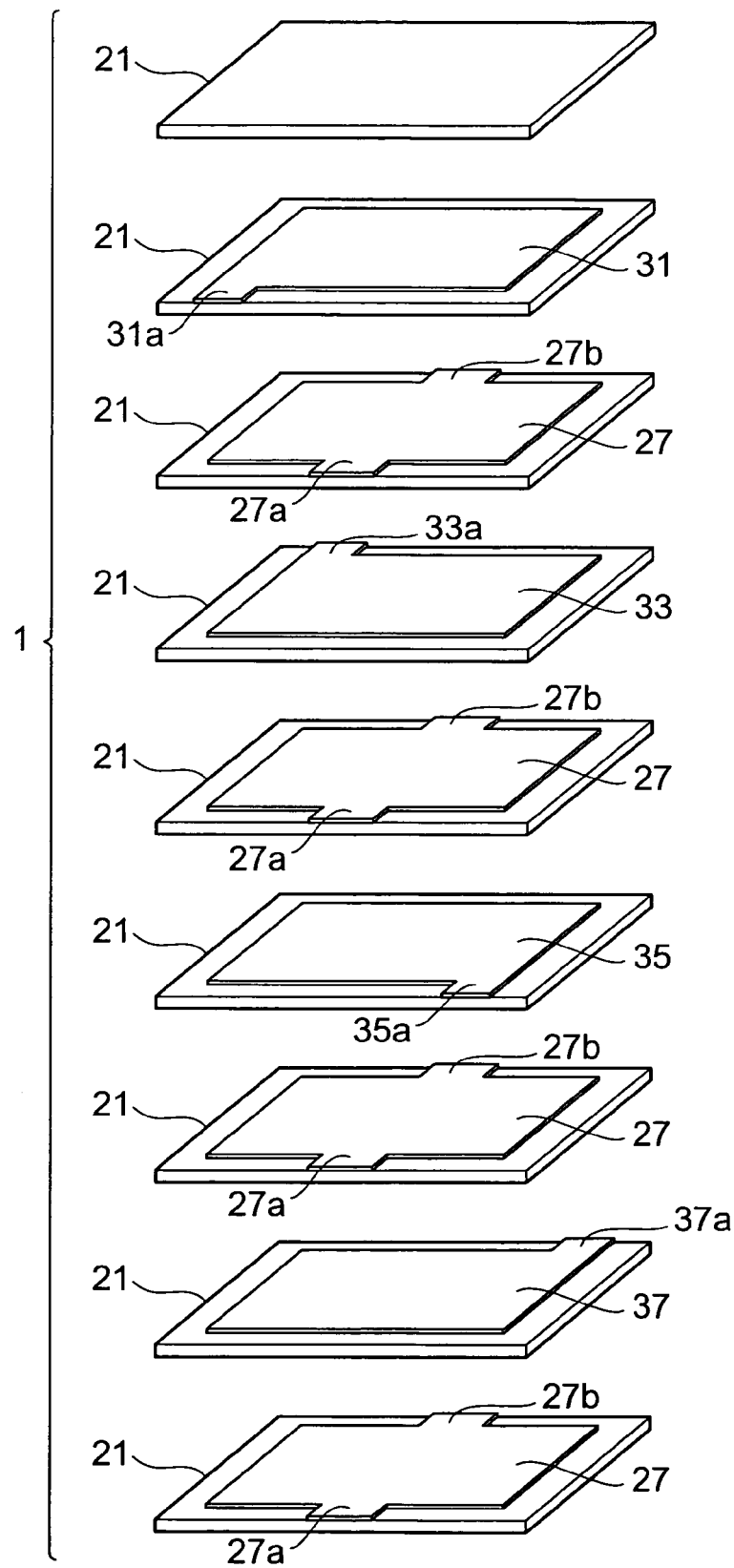
FIG. 14 is an exploded perspective view showing still another modification example of the element body included in the noise filter according to the embodiment.

FIG. 14 is an exploded perspective view showing another modification example of the element body included in the noise filter according to the present embodiment. In the modification example shown in FIG. 14, the element body 1 has a plurality of insulator layers 21 laminated, signal-side internal electrodes 31-37, and ground-side internal electrodes 27. Each of the internal electrodes 27, 31-37 is comprised of a sintered body of an electroconductive paste. Each signal-side internal electrode 31-37 and a ground-side internal electrode 27 are arranged to face each other with the insulator layer 21 in between.

The signal-side internal electrode 31 includes a signal-side lead portion 31a. The signal-side lead portion 31a is led to the first side face 6 and is electrically and physically connected to the first terminal electrode 11. The signal-side internal electrode 31 is electrically connected to the first terminal electrode 11. The signal-side internal electrode 33 includes a signal-side lead portion 33a. The signal-side lead portion 33a is led to the second side face 7 and is electrically and physically connected to the second terminal electrode 12. The signal-side internal electrode 33 is electrically connected to the second terminal electrode 12.

The signal-side internal electrode 35 includes a signal-side lead portion 35a. The signal-side lead portion 35a is led to the first side face 6 and is electrically and physically connected to the fifth terminal electrode 15. The signal-side internal electrode 35 is electrically connected to the fifth terminal electrode 15. The signal-side internal electrode 37 includes a signal-side lead portion 37a. The signal-side lead portion 37a is led to the second side face 7 and is electrically and physically connected to the sixth terminal electrode 16. The signal-side internal electrode 37 is electrically connected to the sixth terminal electrode 16.

Figure 15:
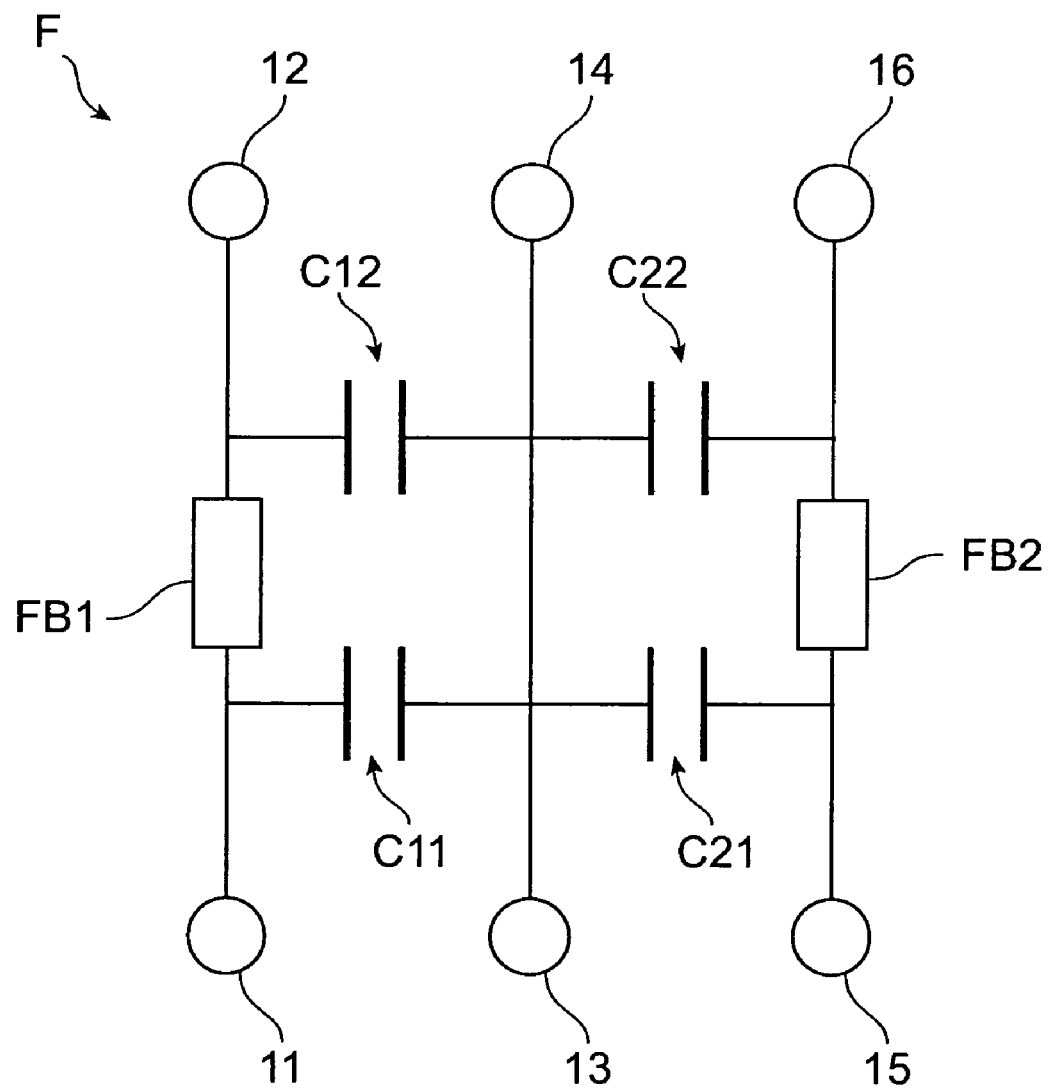
FIG. 15 is an equivalent circuit diagram of the modification example of the noise filter shown in FIG. 14.

The noise filter with the element body 1 shown in FIG. 14, as shown in FIG. 15, has four capacitors C11, C12, C21, C22, and ferrite bead inductors FB1, FB2. The capacitor C11 is comprised of the signal-side internal electrode 31 and the ground-side internal electrode 27 facing the signal-side internal electrode 31. The capacitor C12 is comprised of the signal-side internal electrode 33 and the ground-side internal electrode 27 facing the signal-side internal electrode 33. The capacitor C21 is comprised of the signal-side internal electrode 35 and the ground-side internal electrode 27 facing the signal-side internal electrode 35. The capacitor C22 is comprised of the signal-side internal electrode 37 and the ground-side internal electrode 27 facing the signal-side internal electrode 37.

As described above, the modification example shown in FIG. 14 also achieves a further improvement in the noise removal effect of the noise filter.

Figure 16:
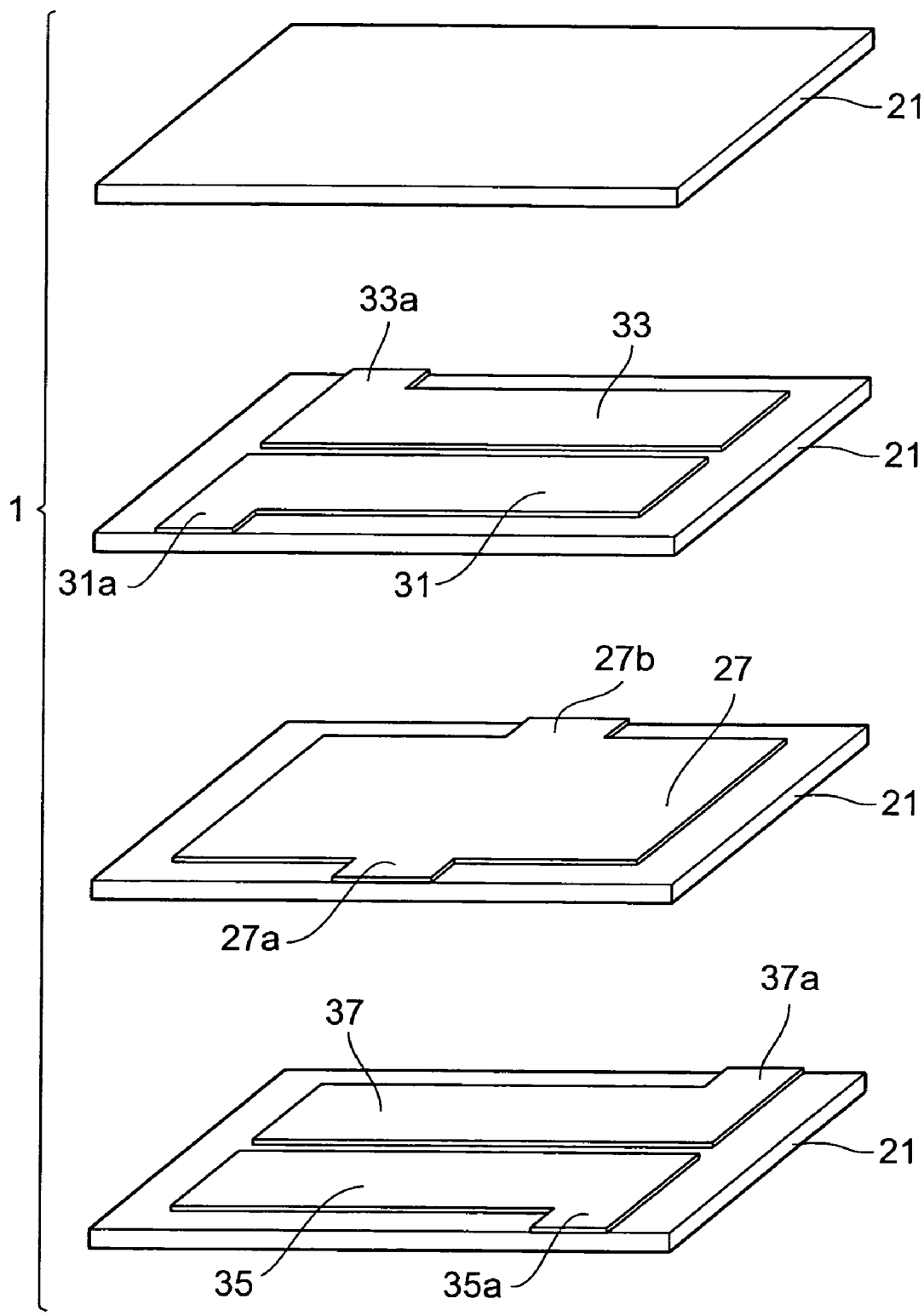
FIG. 16 is an exploded perspective view showing another modification example of the element body included in the noise filter according to the embodiment.

FIG. 16 is an exploded perspective view showing another modification example of the element body included in the noise filter according to the present embodiment. The element body 1 shown in FIG. 16 is different in the locations of the signal-side internal electrodes 31-37 from the element body 1 shown in FIG. 14.

The signal-side internal electrode 31 and the signal-side internal electrode 33 are arranged flush with each other. Namely, the signal-side internal electrode 31 and the signal-side internal electrode 33 are located on the same insulator layer 21. The signal-side internal electrode 31 and the signal-side internal electrode 33 are juxtaposed in the facing direction of the first side face 6 and the second side face 7 and with a predetermined clearance, and are electrically isolated from each other.

The signal-side internal electrode 35 and the signal-side internal electrode 37 are arranged flush with each other. Namely, the signal-side internal electrode 35 and the signal-side internal electrode 37 are located on the same insulator layer 21. The signal-side internal electrode 35 and the signal-side internal electrode 37 are juxtaposed in the facing direction of the first side face 6 and the second side face 7 and with a predetermined clearance, and are electrically isolated from each other.

In the modification example shown in FIG. 16, the signal-side internal electrode 31 and the signal-side internal electrode 33 are arranged flush with each other, and the signal-side internal electrode 35 and the signal-side internal electrode 37 flush with each other. This configuration decreases the number of layers of internal electrodes 27, 31-37 and the noise filter (element body 1) can be constructed in a lower profile.

Figure 17:
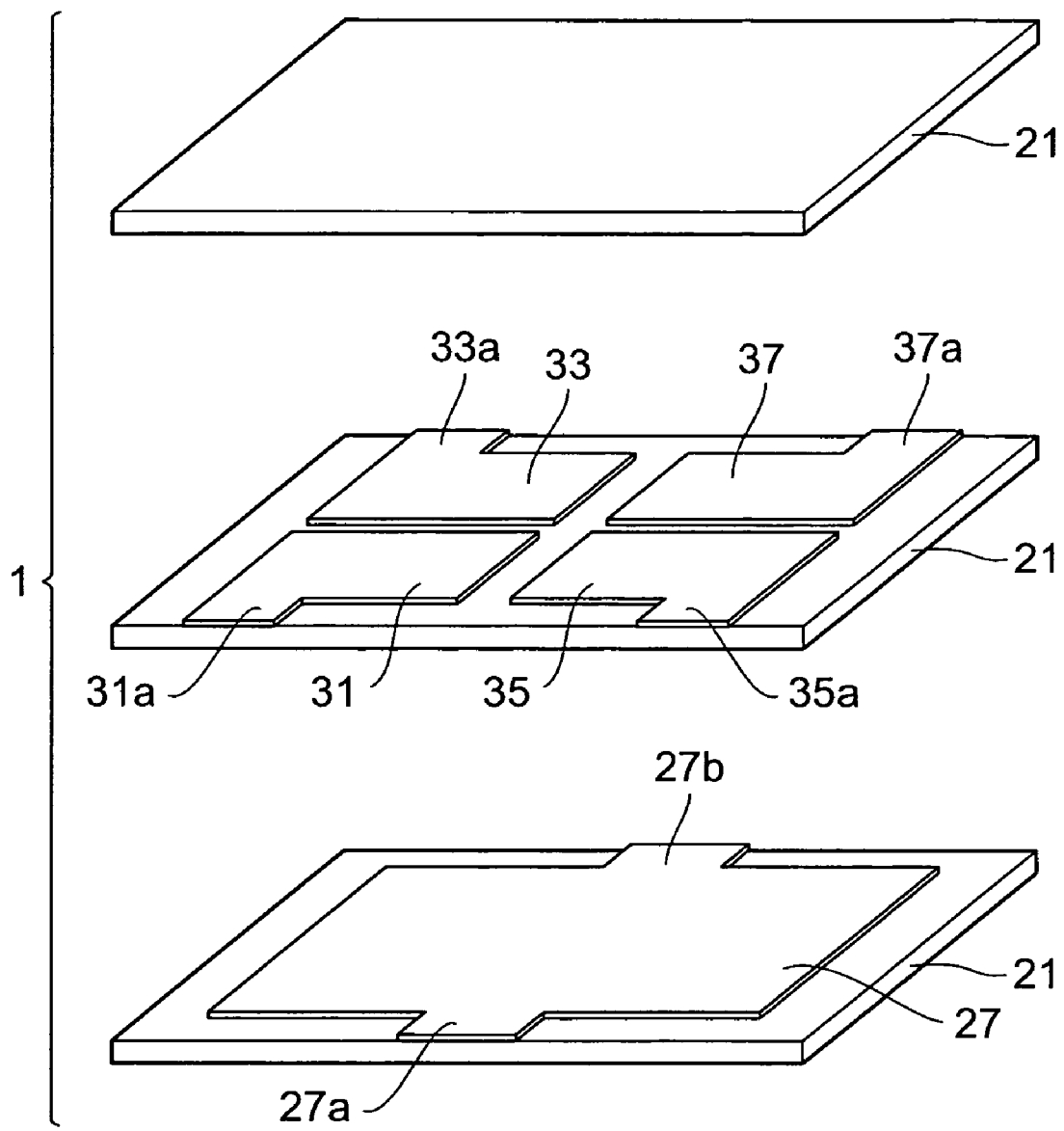
FIG. 17 is an exploded perspective view showing still another modification example of the element body included in the noise filter according to the embodiment.

FIG. 17 is an exploded perspective view showing a modification example of the element body included in the noise filter according to the present embodiment. The element body 1 shown in FIG. 17 is different in the locations of the signal-side internal electrodes 31-37 from the element body 1 shown in FIG. 14.

The signal-side internal electrodes 31-37 are arranged flush with each other. Namely, the signal-side internal electrodes 31-37 are located on the same insulator layer 21. The signal-side internal electrodes 31-37 are arranged alongside in a matrix pattern and with a predetermined clearance, and are electrically isolated from each other.

In the modification example shown in FIG. 17, the signal-side internal electrodes 31-37 are arranged flush with each other. This further decreases the number of layers of internal electrodes 27, 31-37 and the noise filter (element body 1) can be constructed in a still lower profile.

Figure 18:
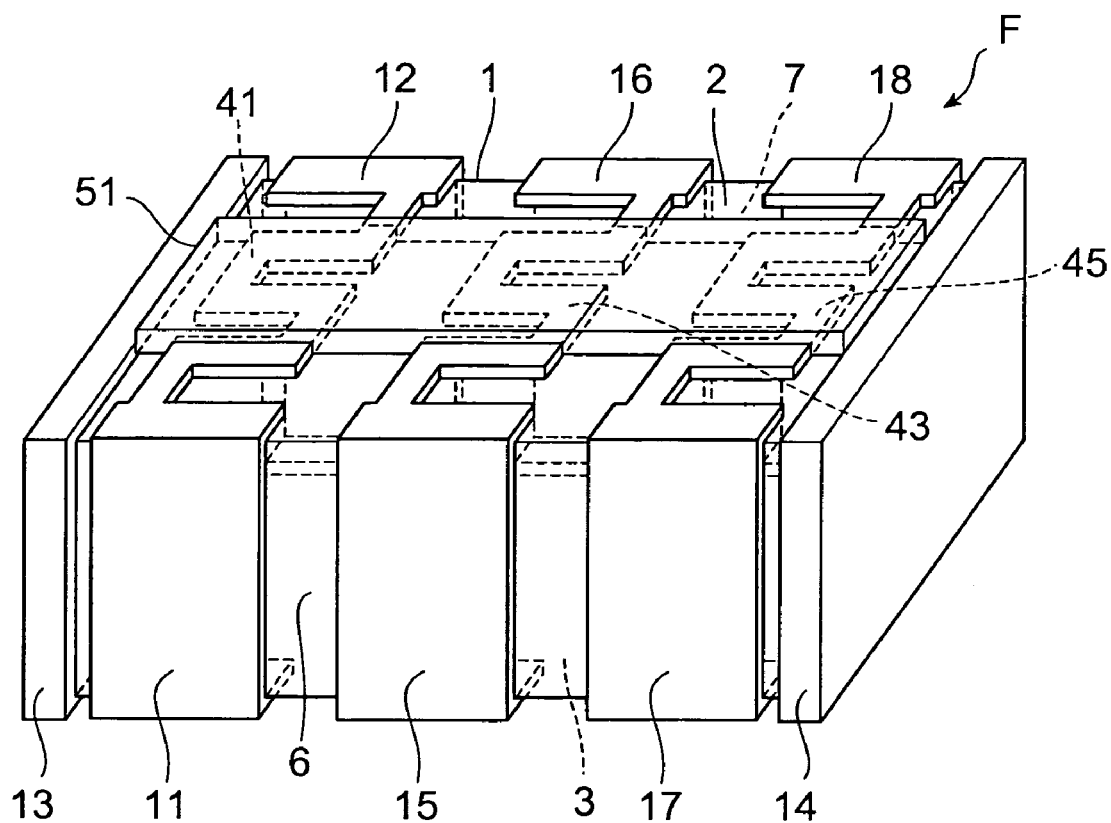
FIG. 18 is a perspective view of another modification example of the noise filter according to the embodiment.
Figure 19:
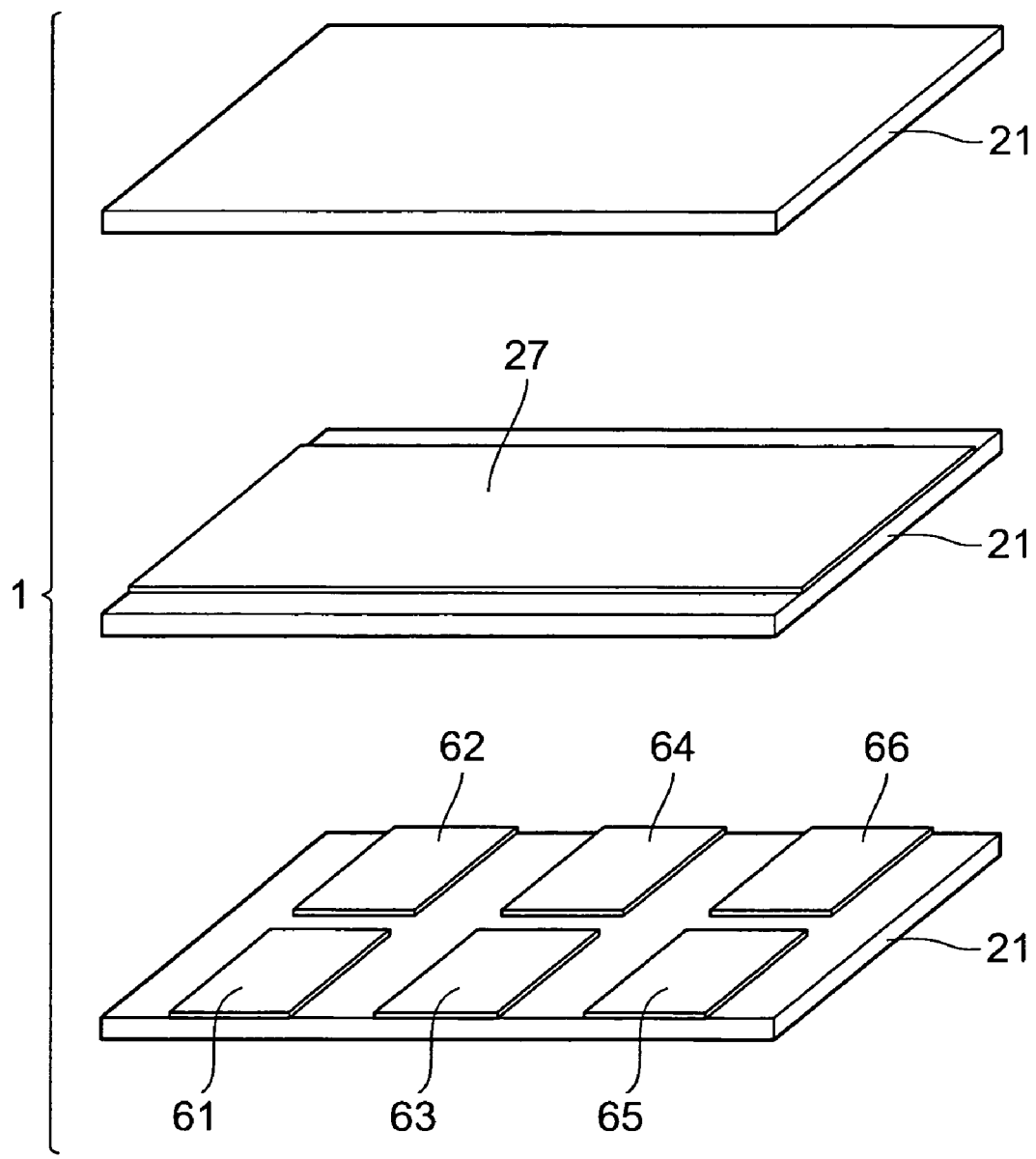
FIG. 19 is an exploded perspective view of the element body included in the modification example of the noise filter according to the embodiment.
Figure 20:
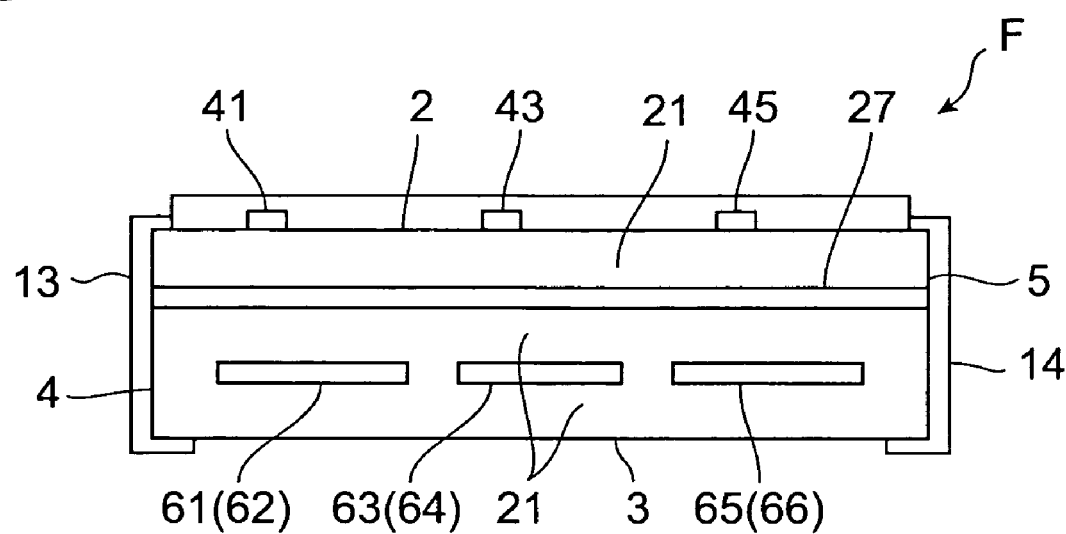
FIG. 20 is a schematic view for explaining a sectional configuration of the modification example of the noise filter according to the embodiment.

Next, a configuration of a further modification example of the noise filter according to the present embodiment will be described with reference to FIGS. 18-20. FIG. 18 is a perspective view of the modification example of the noise filter according to the present embodiment. FIG. 19 is an exploded perspective view of the element body included in the modification example of the noise filter according to the present embodiment. FIG. 20 is a schematic view for explaining a sectional configuration of the modification example of the noise filter according to the present embodiment.

The noise filter F of the modification example, as shown in FIG. 18, has an element body 1, and first to eighth terminal electrodes 11-18 disposed on the exterior of the element body 1. The first terminal electrode 11, fifth terminal electrode 15, and seventh terminal electrode 17 are disposed on the first side face 6 of the element body 1. The second terminal electrode 12, sixth terminal electrode 16, and eighth terminal electrode 18 are disposed on the second side face 7 of the element body 1. The third terminal electrode 13 is disposed on the first end face 4 of the element body 1, and the fourth terminal electrode 14 on the second end face 5 of the element body 1. The first and second terminal electrodes 11, 12, the fifth and sixth terminal electrodes 15, 16, and the seventh and eighth terminal electrodes 17, 18 function as signal-side terminal electrodes. The third and fourth terminal electrodes 13, 14 function as ground-side terminal electrodes.

The element body 1, as shown in FIG. 19, has a plurality of insulator layers 21 laminated, signal-side internal electrodes 61-66, and a ground-side internal electrode 27. Each of the internal electrodes 27, 61-66 is comprised of a sintered body of an electroconductive paste. Each signal-side internal electrode 61-66 and the ground-side internal electrode 27 are arranged to face each other with the insulator layer 21 in between. The signal-side internal electrodes 61-66 are arranged flush with each other. Namely, the signal-side internal electrodes 61-66 are located on the same insulator layer 21. The signal-side internal electrodes 61-66 are arranged alongside in a matrix pattern and with a predetermined clearance, and are electrically isolated from each other.

The signal-side internal electrode 61 is led to the first side face 6 and is electrically and physically connected to the first terminal electrode 11. The signal-side internal electrode 62 is led to the second side face 7 and is electrically and physically connected to the second terminal electrode 12. The signal-side internal electrode 63 is led to the first side face 6 and is electrically and physically connected to the fifth terminal electrode 15. The signal-side internal electrode 64 is led to the second side face 7 and is electrically and physically connected to the sixth terminal electrode 16. The signal-side internal electrode 65 is led to the first side face 6 and is electrically and physically connected to the seventh terminal electrode 17. The signal-side internal electrode 66 is led to the second side face 7 and is electrically and physically connected to the eighth terminal electrode 18.

The ground-side internal electrode 27 is led to the first and second end faces 4, 5 and is electrically and physically connected to the third and fourth terminal electrodes 13, 14. The ground-side internal electrode 27 penetrates the element body 1 from the first end face 4 to the second end face 5.

As also shown in FIG. 20, three connection conductors 41-45 are disposed on the first principal face 2 of the element body 1. The connection conductor 41 electrically connects the first terminal electrode 11 and the second terminal electrode 12. The connection conductor 43 electrically connects the fifth terminal electrode 15 and the sixth terminal electrode 16. The connection conductor 45 electrically connects the seventh terminal electrode 17 and the eighth terminal electrode 18. The connection conductor 45 extends in the facing direction of the first side face 6 and the second side face 7 on the first principal face 2 and is narrower in width than the seventh and eighth terminal electrodes 17, 18. The term "width" herein means a length in the direction in which the first end face 4 and the second end face 5 face each other.

Figure 21:
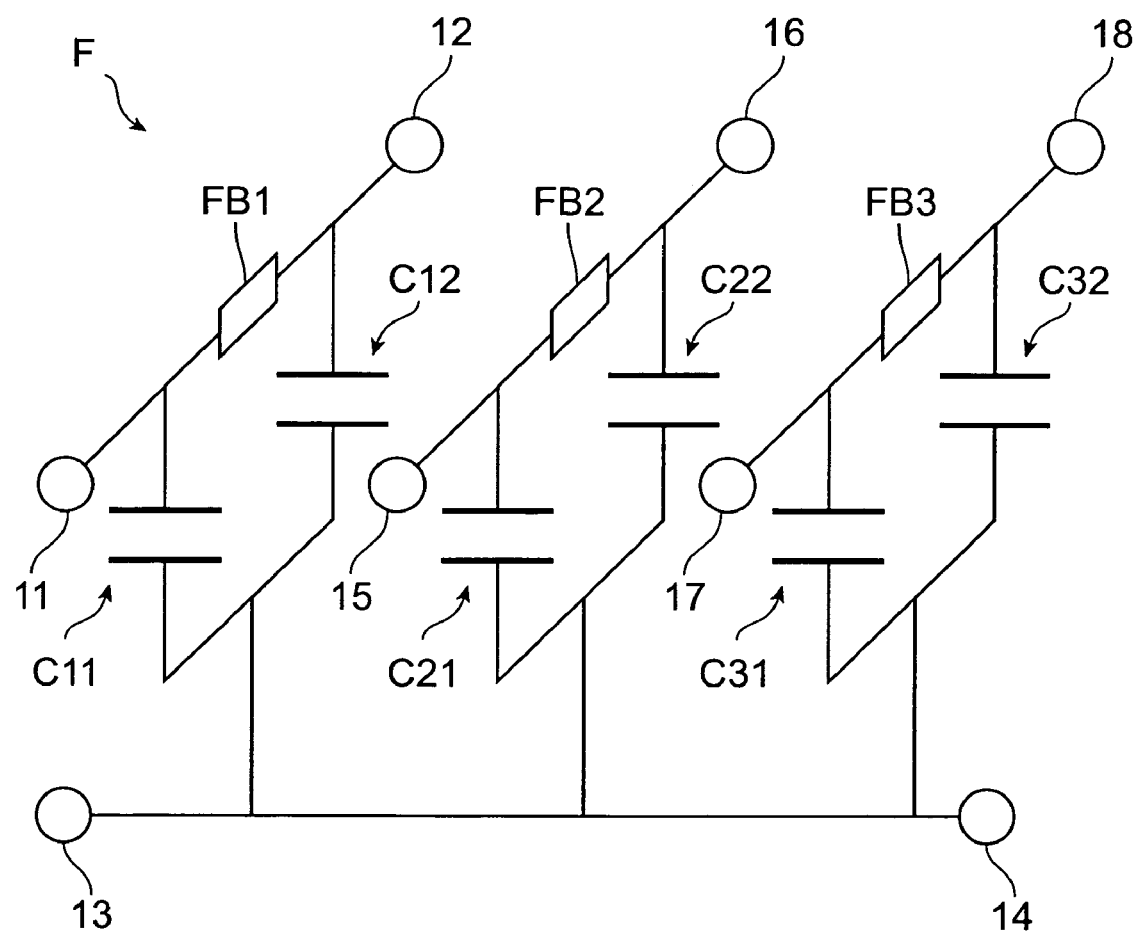
FIG. 21 is an equivalent circuit diagram of the modification example of the noise filter shown in FIG. 18.

The noise filter F shown in FIGS. 18-20, as shown in FIG. 21, has six capacitors C11, C12, C21, C22, C31, C32, and three ferrite bead inductors FB1-FB3. The capacitor C11 is comprised of the signal-side internal electrode 61 and the ground-side internal electrode 27. The capacitor C12 is comprised of the signal-side internal electrode 62 and the ground-side internal electrode 27 The capacitor C21 is comprised of the signal-side internal electrode 63 and the ground-side internal electrode 27. The capacitor C22 is comprised of the signal-side internal electrode 64 and the ground-side internal electrode 27. The capacitor C31 is comprised of the signal-side internal electrode 65 and the ground-side internal electrode 27. The capacitor C32 is comprised of the signal-side internal electrode 66 and the ground-side internal electrode 27. The ferrite bead inductor FB1 is comprised of the connection conductor 41 and the ferrite-containing resin 51. The ferrite bead inductor FB2 is comprised of the connection conductor 43 and the ferrite-containing resin 51. The ferrite bead inductor FB3 is comprised of the connection conductor 45 and the ferrite-containing resin 51.

As described above, the modification example shown in FIGS. 18-20 also achieves a further improvement in the noise removal effect of the noise filter F.

Figure 22:
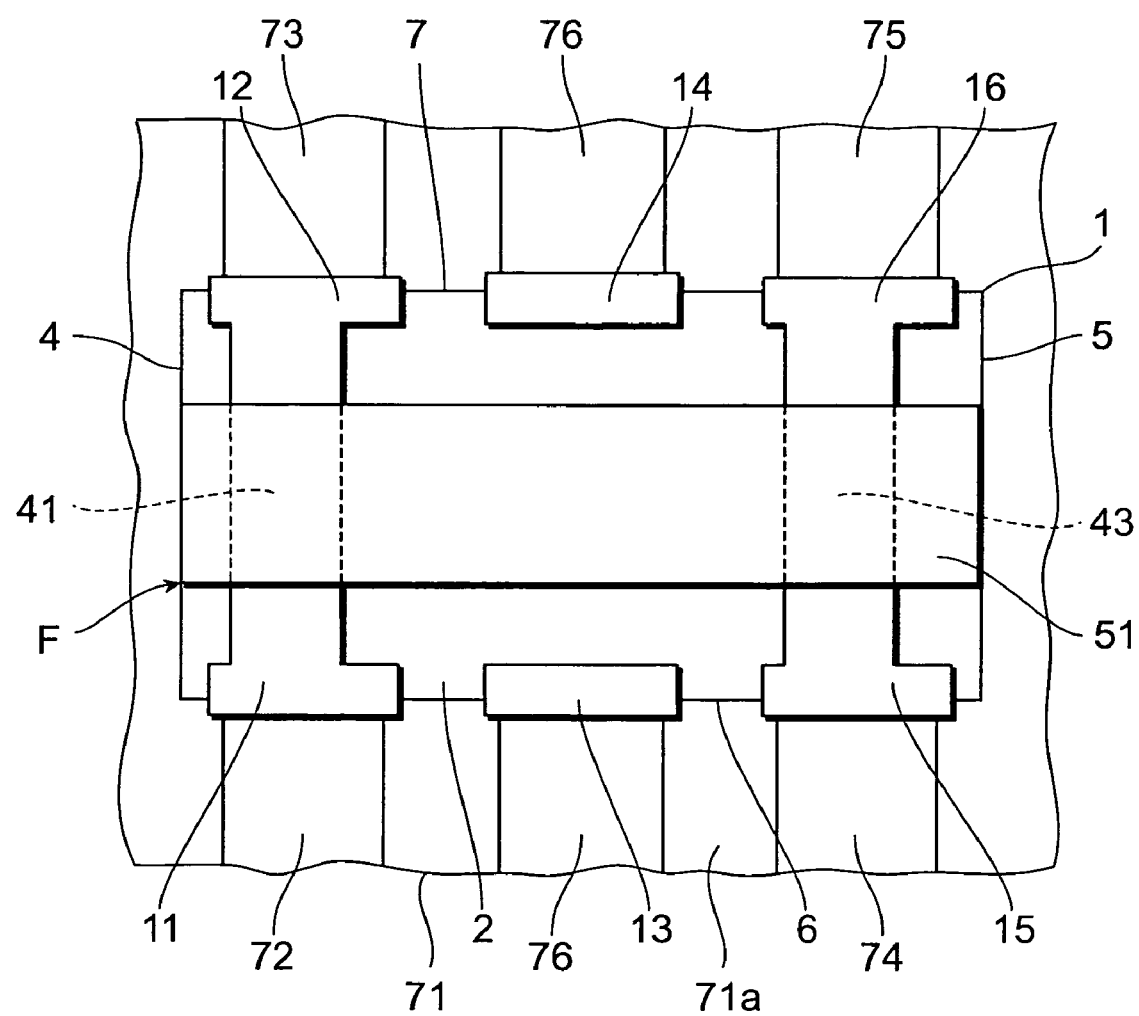
FIG. 22 is a plan view showing a mounted structure of the noise filter according to the embodiment.
Figure 23:
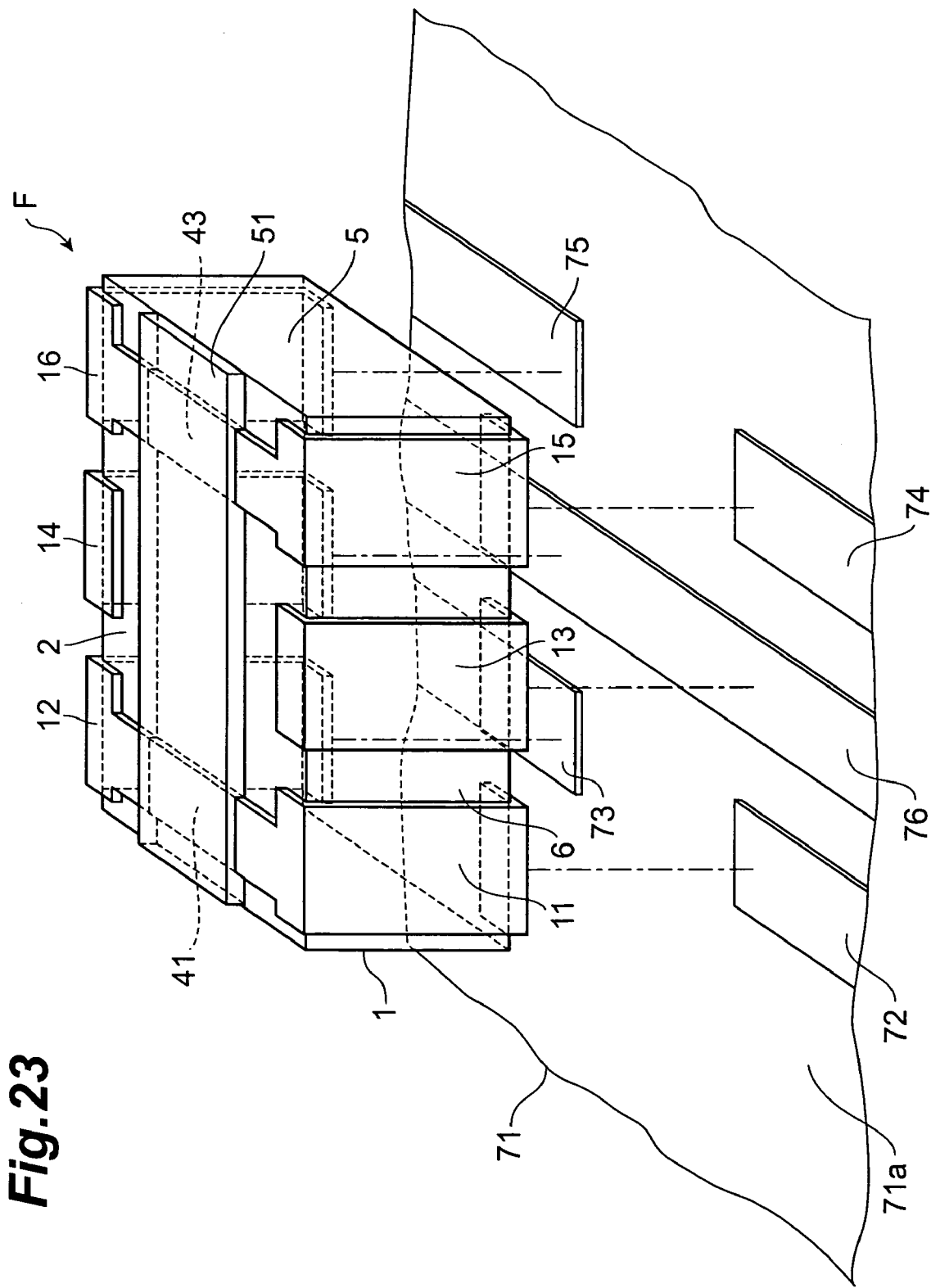
FIG. 23 is a perspective view showing the mounted structure of the noise filter according to the embodiment.

Subsequently, a mounted structure of the noise filter F according to the present embodiment will be described with reference to FIGS. 22 and 23. FIG. 22 is a plan view showing the mounted structure of the noise filter according to the present embodiment. FIG. 23 is a perspective view showing the mounted structure of the noise filter according to the present embodiment. The below will describe an example of mounting of the noise filter F shown in FIGS. 1-3. Although the description is omitted herein, mounted structures of the noise filters according to the modification examples shown in FIGS. 5-17 are also similar to the mounted structure of the noise filter F shown in FIGS. 22 and 23.

As shown in FIGS. 22 and 23, the noise filter F is mounted on a circuit board 71 by a technique such as soldering. There are four signal electrodes 72-75 and a ground electrode 76 arranged on a mounting surface 71a of the circuit board 71.

The first terminal electrode 11 of the noise filter F is physically and electrically connected to the signal electrode 72. The second terminal electrode 12 of the noise filter F is physically and electrically connected to the signal electrode 73. The fifth terminal electrode 15 of the noise filter F is physically and electrically connected to the signal electrode 74. The sixth terminal electrode 16 of the noise filter F is physically and electrically connected to the signal electrode 75. The third and fourth terminal electrodes 13, 14 of the noise filter F are physically and electrically connected to the ground electrode 76.

In the noise filter F mounted on the circuit board 71, the capacitors C1, C2 comprised of the internal electrodes 23-27, and the ferrite bead inductors FB1, FB2 comprised of the connection conductors 41, 43 and the ferrite-containing resin 51 are electrically connected through the terminal electrodes 11-16 to the electrodes 72-75, 76 arranged on the circuit board 71. This permits the noise filter F to exercise the function as a noise filter on the circuit board 71.

Figure 24:
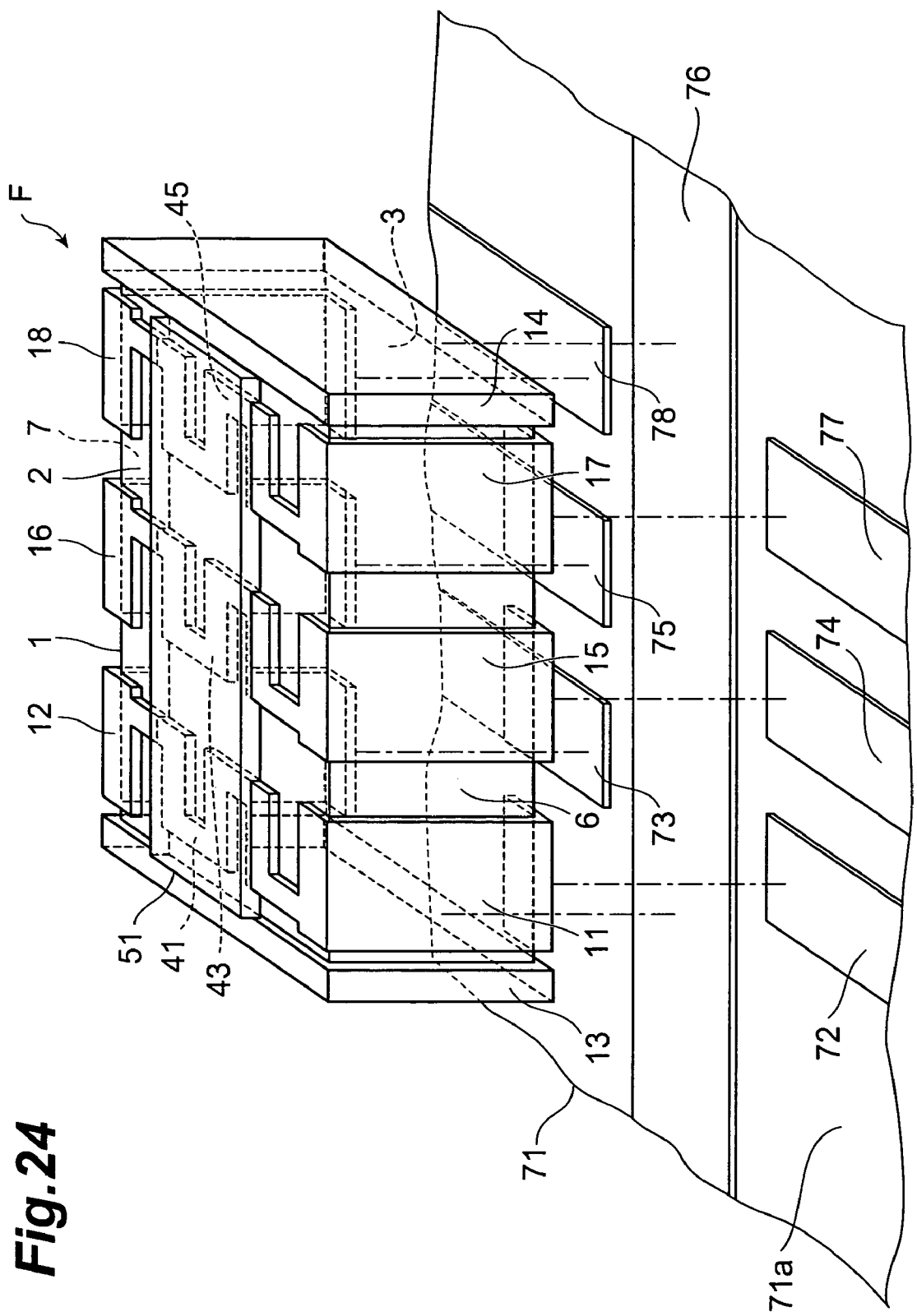
FIG. 24 is a perspective view showing the mounted structure of the noise filter according to the embodiment.

Subsequently, another mounted structure of the noise filter F according to the present embodiment will be described with reference to FIG. 24. FIG. 24 is a perspective view showing the mounted structure of the noise filter according to the present embodiment. The below will describe an example of mounting of the noise filter F shown in FIGS. 18-20.

As shown in FIG. 24, the noise filter F is mounted on a circuit board 71 by a technique such as soldering. There are six signal electrodes 72-75, 77, 78 and a ground electrode 76 arranged on a mounting surface 71a of the circuit board 71.

The first terminal electrode 11 of the noise filter F is physically and electrically connected to the signal electrode 72. The second terminal electrode 12 of the noise filter F is physically and electrically connected to the signal electrode 73. The fifth terminal electrode 15 of the noise filter F is physically and electrically connected to the signal electrode 74. The sixth terminal electrode 16 of the noise filter F is physically and electrically connected to the signal electrode 75. The seventh terminal electrode 17 of the noise filter F is physically and electrically connected to the signal electrode 77. The eighth terminal electrode 18 of the noise filter F is physically and electrically connected to the signal electrode 78. The third and fourth terminal electrodes 13, 14 of the noise filter F are physically and electrically connected to the ground electrode 76.

In the noise filter F mounted on the circuit board 71, the capacitors C11, C12, C21, C22, C31, C32 comprised of the internal electrodes 27, 61-66, and the ferrite bead inductors FB1-FB3 comprised of the connection conductors 41, 43, 45 and the ferrite-containing resin 51, are electrically connected through the terminal electrodes 11-18 to the electrodes 72-78 arranged on the circuit board 71. This permits the noise filter F to exercise the function as a noise filter on the circuit board 71.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A noise filter comprising:
an element body;
first to fourth terminal electrodes disposed on an exterior of the element body; and
a connection conductor disposed on the exterior;
wherein a capacitor is formed in the element body and is electrically connected between the first and second terminal electrodes and the third and fourth terminal electrodes;
wherein the first and second terminal electrodes are electrically connected through the connection conductor; and
wherein the connection conductor is covered by a resin containing ferrite.

2. The noise filter according to claim 1,
wherein the element body has a plurality of insulator layers laminated, and a signal-side internal electrode and a ground-side internal electrode arranged to face each other with the insulator layer in between,
wherein the signal-side internal electrode includes a pair of signal-side lead portions led to the exterior, and the pair of signal-side lead portions are electrically connected to the first and second terminal electrodes, respectively,
wherein the ground-side internal electrode includes a pair of ground-side lead portions led to the exterior, and the pair of ground-side lead portions are electrically connected to the third and fourth terminal electrodes, respectively, and
wherein the signal-side internal electrode and the ground-side internal electrode form the capacitor.

3. The noise filter according to claim 2, further comprising:
fifth and sixth terminal electrodes disposed on the exterior; and
a new connection conductor disposed on the exterior;
wherein the element body further has a new signal-side internal electrode arranged to face the ground-side internal electrode with the insulator layer in between,
wherein the new signal-side internal electrode includes a pair of signal-side lead portions led to the exterior, and the pair of signal-side lead portions are electrically connected to the fifth and sixth terminal electrodes, respectively, wherein the new signal-side internal electrode and the ground-side internal electrode form a capacitor, wherein the fifth and sixth terminal electrodes are electrically connected through the new connection conductor, and wherein the new connection conductor is covered by a resin containing ferrite.

4. The noise filter according to claim 3, wherein the signal-side internal electrode and the new signal-side internal electrode are arranged flush with each other.

5. The noise filter according to claim 1, wherein the element body has a plurality of insulator layers laminated, and a ground-side internal electrode and a pair of signal-side internal electrodes arranged to face each other with the insulator layer in between, wherein one signal-side internal electrode out of the pair of signal-side internal electrodes includes a signal-side lead portion led to the exterior, and the signal-side lead portion is electrically connected to the first terminal electrode, wherein the other signal-side internal electrode out of the pair of signal-side internal electrodes includes a signal-side lead portion led to the exterior, and the signal-side lead portion is electrically connected to the second terminal electrode, wherein the ground-side internal electrode includes a pair of ground-side lead portions led to the exterior, and the pair of ground-side lead portions are electrically connected to the third and fourth terminal electrodes, respectively, and wherein the pair of signal-side internal electrodes and the ground-side internal electrode form the capacitor.

6. The noise filter according to claim 5, wherein the pair of signal-side internal electrodes are arranged flush with each other.

7. The noise filter according to claim 5, further comprising:

fifth and sixth terminal electrodes disposed on the exterior; and a new connection conductor disposed on the exterior;

wherein the element body further has a pair of new signal-side internal electrodes arranged to face the ground-side internal electrode with the insulator layer in between, wherein one signal-side internal electrode out of the pair of new signal-side internal electrodes includes a signal-side lead portion led to the exterior, and the signal-side lead portion is electrically connected to the fifth terminal electrode, wherein the other signal-side internal electrode out of the pair of new signal-side internal electrodes includes a signal-side lead portion led to the exterior, and the signal-side lead portion is electrically connected to the sixth terminal electrode, wherein the pair of new signal-side internal electrodes and the ground-side internal electrode form a capacitor, wherein the fifth and sixth terminal electrodes are electrically connected through the new connection conductor, and wherein the new connection conductor is covered by a resin containing ferrite.

8. The noise filter according to claim 7, wherein the pair of new signal-side internal electrodes are arranged flush with each other.

9. The noise filter according to claim 7, wherein the pair of signal-side internal electrodes and the pair of new signal-side internal electrodes are arranged flush with each other.

10. The noise filter according to claim 1, wherein the connection conductor is narrower in width than the first and second terminal electrodes.

11. The noise filter according to claim 1, wherein the connection conductor is of a meander shape.

12. A noise filter mounted structure comprising:

the noise filter as defined in claim 1; and a circuit board in which a ground electrode and at least two signal electrodes are disposed on a mounting surface;

wherein the first and second terminal electrodes of the noise filter are connected to different signal electrodes, respectively, out of said at least two signal electrodes, and wherein the third and fourth terminal electrodes of the noise filter are connected each to the ground electrode.

* * * * *